United States Patent [19]

Kakuda et al.

[11] Patent Number: 4,694,422

[45] Date of Patent: Sep. 15, 1987

[54] PROTOCOL VALIDATION SYSTEM

[75] Inventors: Yoshiaki Kakuda, Tokyo; Yasushi Wakahara, Kanagawa; Masamitsu Norigoe, Saitama, all of Japan

[73] Assignee: Kokusai Denshin Denwa Co., Ltd., Tokyo, Japan

[21] Appl. No.: 749,591

[22] Filed: Jun. 24, 1985

[30] Foreign Application Priority Data

Dec. 25, 1984 [JP] Japan .............................. 59-271938
Feb. 20, 1985 [JP] Japan .............................. 60-30208

[51] Int. Cl.[4] .............................................. G06F 1/00
[52] U.S. Cl. .................................................. 364/900
[58] Field of Search ................. 364/200 MS File, 900 MS File

[56] References Cited

U.S. PATENT DOCUMENTS 4,368,512  1/1983  Kyu et al. ........................... 364/200

OTHER PUBLICATIONS

"On Communication Finite-State Machines", Journal of the Association for Computing Machinery, vol. 30, No. 2, Apr. 1983, pp. 323-342.

"General Technique for Communications Protocol Validation", IBM J. Res. Develop., vol. 22, No. 4, Jul. 1978, pp. 393-404.

Primary Examiner—Raulfe B. Zache
Attorney, Agent, or Firm—Armstrong, Nikaido, Marmelstein & Kubovcik

[57] ABSTRACT

A communication protocol validation system which produces a state transition expansion chart having a plurality of states and a plurality of transitions between states in electrical form to find errors such as an unspecified executable transition, a specified unexecutable transition and a deadlock has been improved by providing new error items of a bounded overflow and an unbounded overflow and deleting redundant transitions. Thus, a number of states and a number of transitions in the chart are reduced, and the validation is implemented by using a reasonable amount of hardware in a reasonable time.

4 Claims, 59 Drawing Figures

EXAMPLE OF PROTOCOL

PROCESS 1   PROCESS 2   PROCESS 3

ANOTHER EXAMPLE OF PROTOCOL

PROCESS 1   PROCESS 2

PROCESS 1

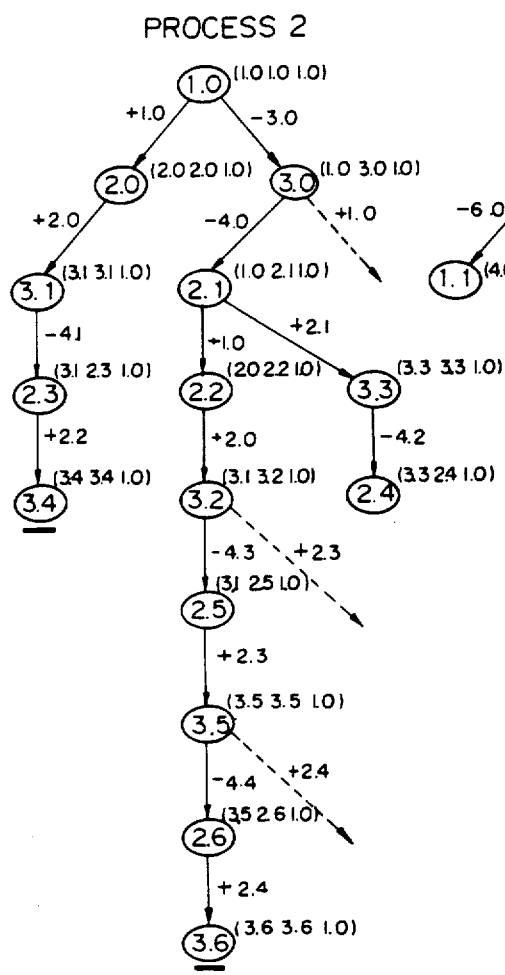
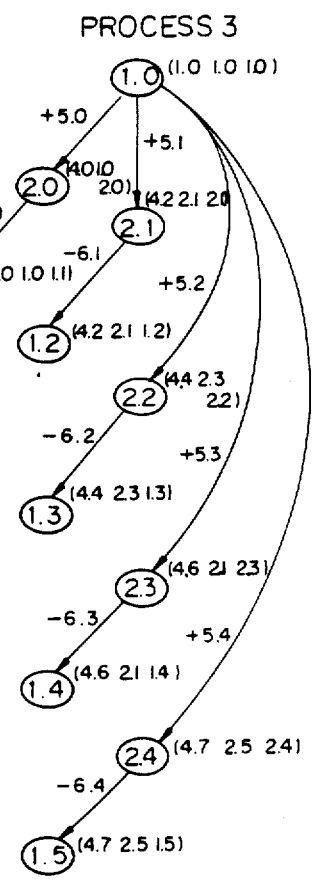
Fig.2(b) PRIOR ART PROCESS 2
Fig.2(c) PRIOR ART PROCESS 3

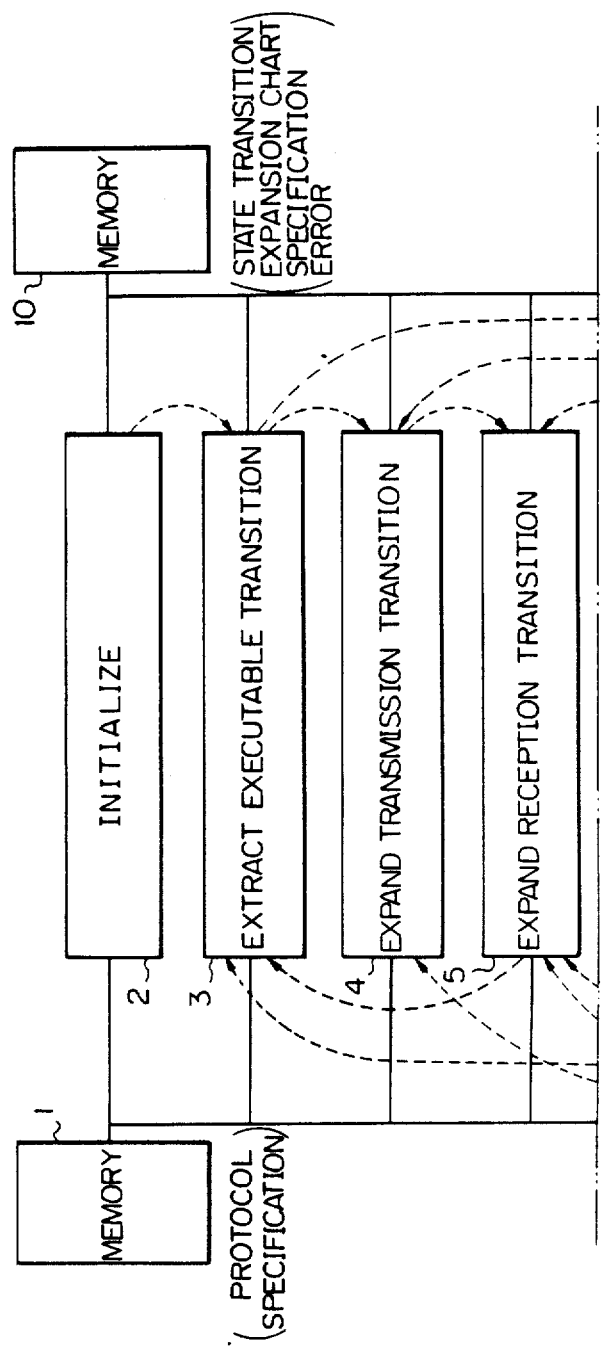

Fig.4(a)

PROCESS STATE TRANSITION

| PROCESS NAME | STATE NAME | TRANSITION {((LABEL), STATE AFTER TRANSITION [ SEND/REC PROCESS NAME ] )} | NUMBER OF TIMES OF OCCURRANCE |
|---|---|---|---|
| 1 | 1 | (-1) 2 [2] (+3) 3 [2] (+6) 2 [3] | 0 |
| 1 | 2 | (-2) 3 [2] (-5) 4 [3] | 0 |
| 1 | 3 | (+4) 2 [2] (+3) 3 [2] | 0 |
| 1 | 4 | (+6) 4 [3] | 0 |
| 2 | 1 | (+1) 2 [1] (-3) 3 [1] | 0 |
| 2 | 2 | (+2) 3 [1] (+1) 2 [1] | 0 |
| 2 | 3 | (-4) 2 [1] | 0 |
| 3 | 1 | (+5) 2 [1] | 0 |
| 3 | 2 | (-6) 1 [1] | 0 |

Fig.4(b)

PROCESS INITIAL STATE

| PROCESS NAME | INITIAL STATE | L VALUE |
|---|---|---|
| 1 | 1 | ( 1.0  1.0  1.0 ) |
| 2 | 1 | ( 1.0  1.0  1.0 ) |
| 3 | 1 | ( 1.0  1.0  1.0 ) |

Fig.5(a)
STATE TRANSITION EXPANSION CHART

| PROCESS NAME | STATE NAME | L VALUE | EXPANSION STATE TRANSITION |
|---|---|---|---|
| 1 | 1.0 | (1.0 1.0 1.0) | (−1.0) 2.0, (+3.0) 3.0 |
| 1 | 2.0 | (2.0 1.0 1.0) | (−2.0) 3.1 |
| 2 | 1.0 | (1.0 1.0 1.0) | (+1.0) 2.0, (−3.0) 3.0 |
| 2 | 2.0 | (2.0 2.0 1.0) | (+2.0) 3.1 |
| 3 | 1.0 | (1.0 1.0 1.0) | (+5.0) 2.0, (+5.1) 2.1, (+5.2) 2.2, (+5.3) 2.3, (+5.4) 2.4 |

Fig.5(b)
OUTPUT OF UNSPECIFIED EXECUTABLE TRANSITION

| PROCESS NAME | STATE NAME | L VALUE | UNSPECIFIED REC SIGNAL |
|---|---|---|---|
| 1 | 2.0 | (2.0 1.0 1.0) | 3.0 |
| 2 | 3.0 | (1.0 3.0 3.0) | 1.0 |

Fig.5(c)
OUTPUT OF DEADLOCK OUTPUT & STABLE STATE

| EACH PROCESS STATE | | |
|---|---|---|
| PROCESS 1 | PROCESS 2 | PROCESS 3 |
| 4.1 | 2.0 | 1.1 |

Fig.5(d)
OUTPUT OF SPECIFIED UNEXECUTABLE TRANSITION

| PROCESS NAME | STATE NAME | UNEXECUTABLE SIGNAL |
|---|---|---|
| 1 | 4.1 | +6 |

Fig.5(e)
OUTPUT OF BOUNDED OVERFLOW

| PROCESS NAME | STATE NAME | DESTINATION PROCESS NAME | NUMBER OF SIGNAL |
|---|---|---|---|
| 1 | 3.3 | 2 | 3 |
| 2 | 2.3 | 1 | 3 |

Fig.5(f)
OUTPUT OF UNBOUNDED OVERFLOW

| PROCESS NAME | STATE NAME | DESTINATION PROCESS NAME |
|---|---|---|
| — | — | — |

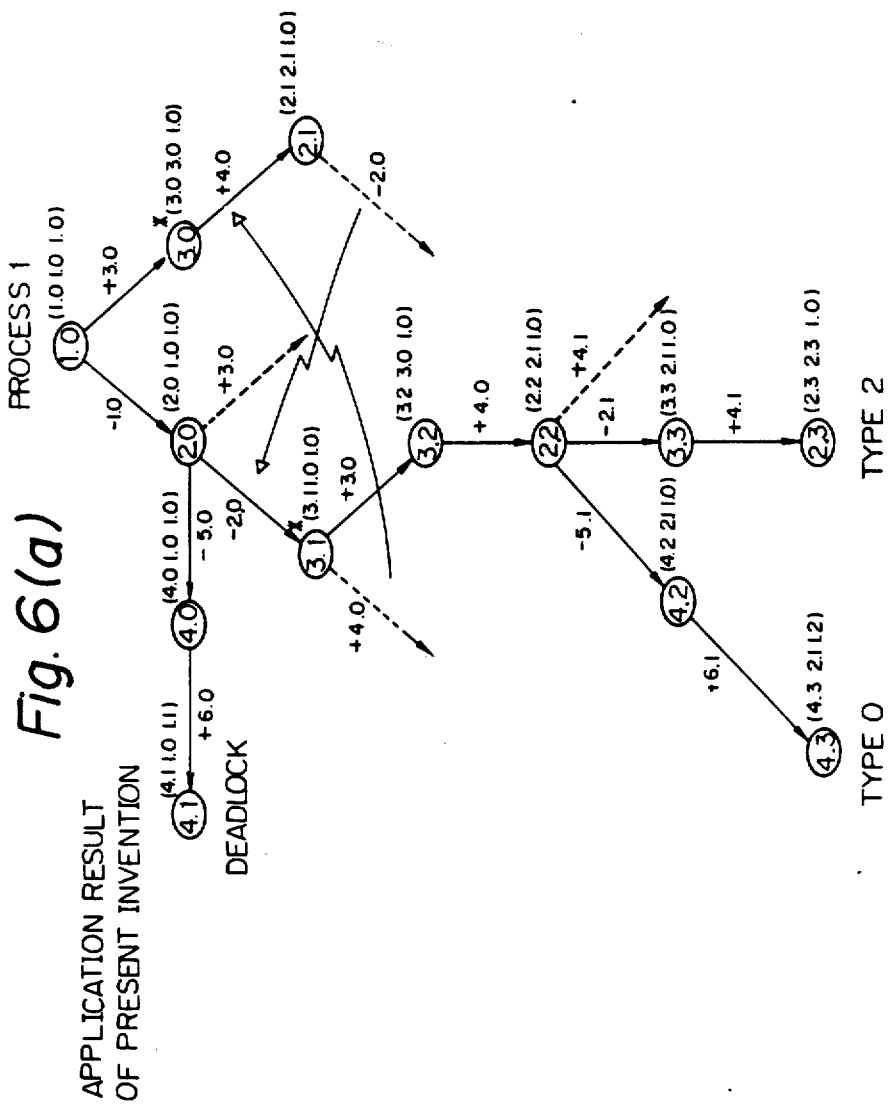

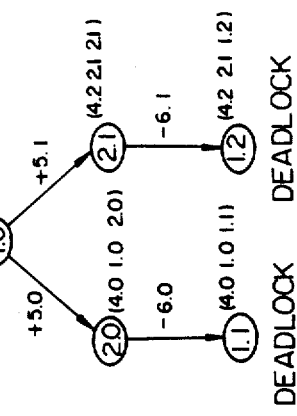
Fig. 6(c) PROCESS 3
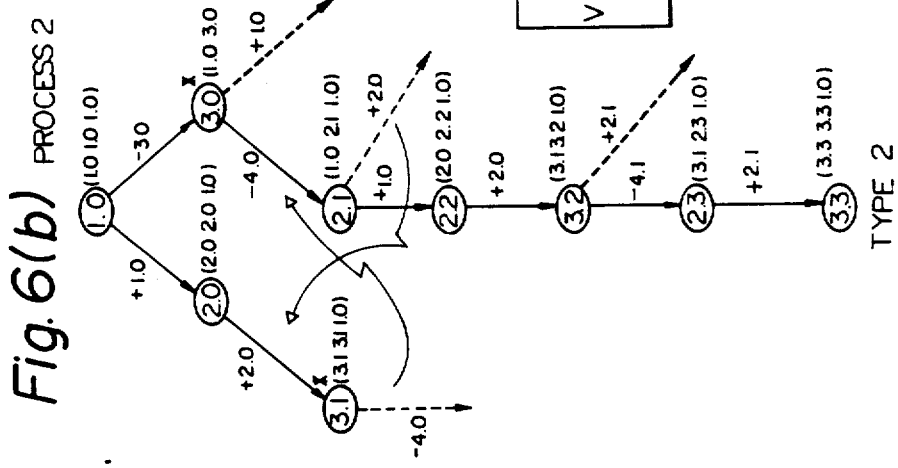
Fig. 6(d)
Fig. 6(b) PROCESS 2

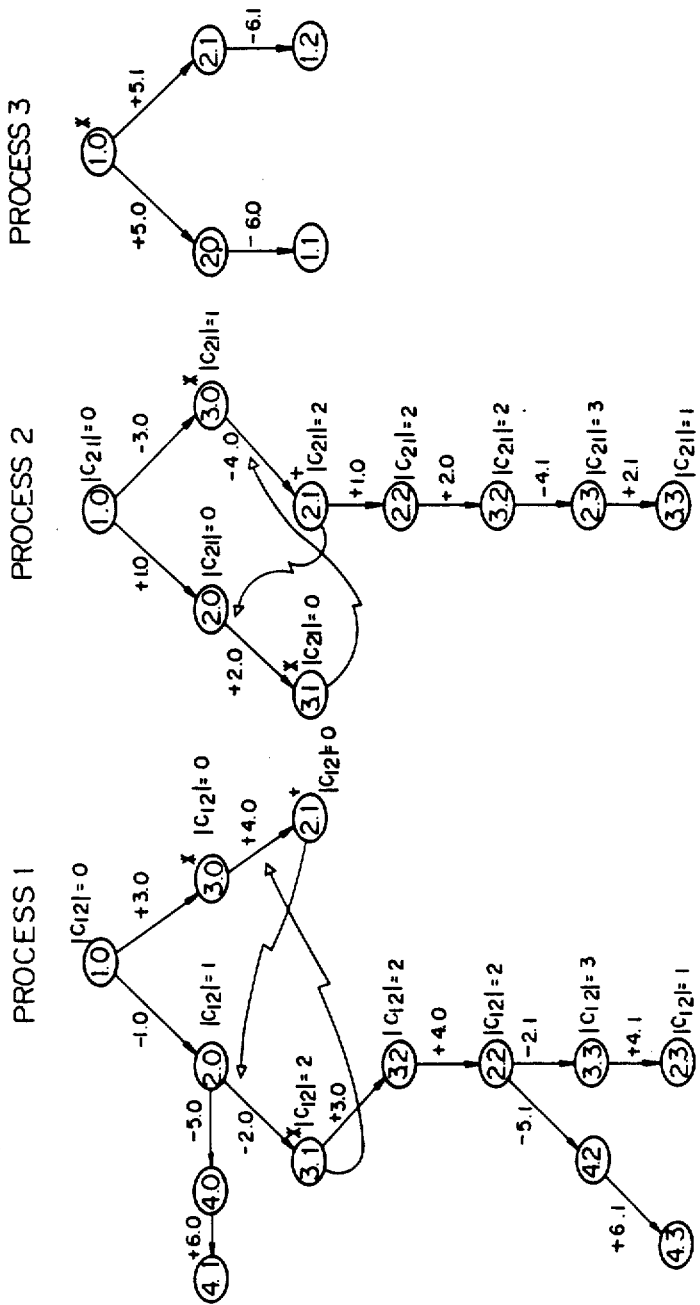

PROCESS 1

PROCESS 2

Fig. 13 CONFIGURATION OF MEMORY 1
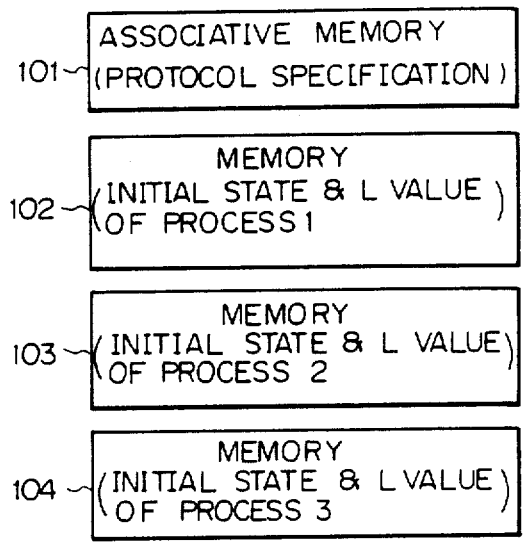
Fig. 19 EXTRACTION OF RECEPTION TRANSITION SEQUENCE
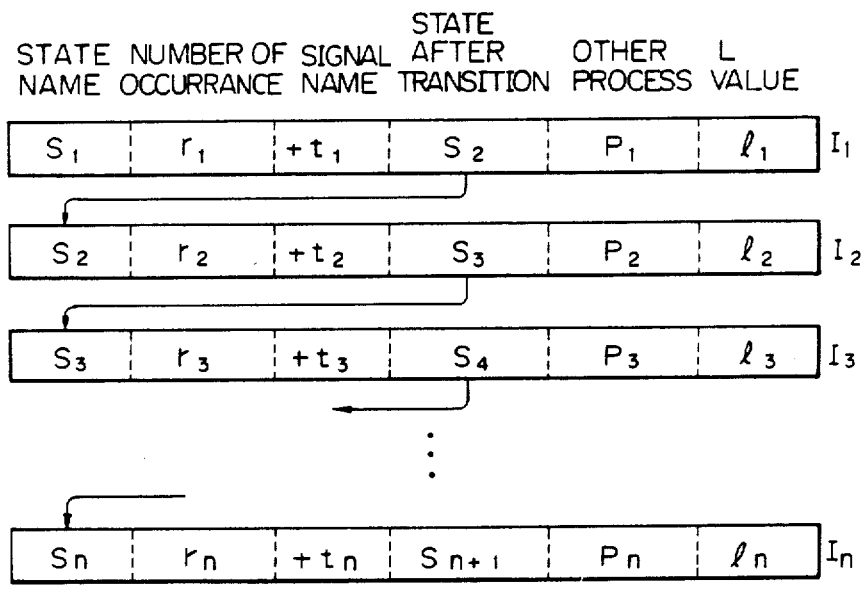

CONFIGURATION OF MEMORY 10

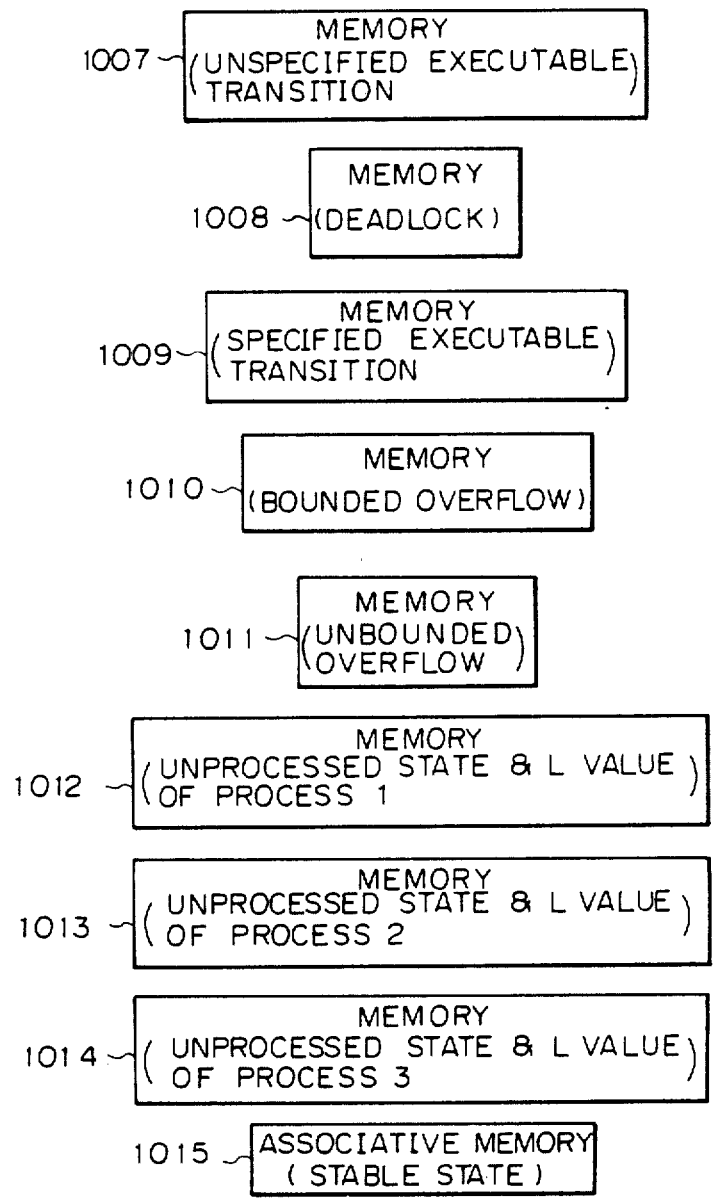
Fig. 14(b) CONFIGURATION OF MEMORY 10

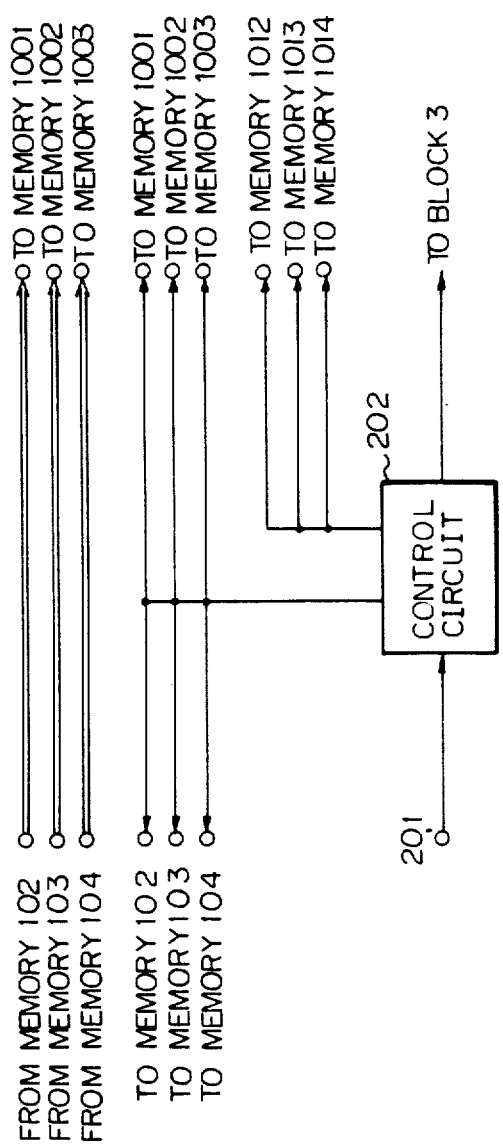

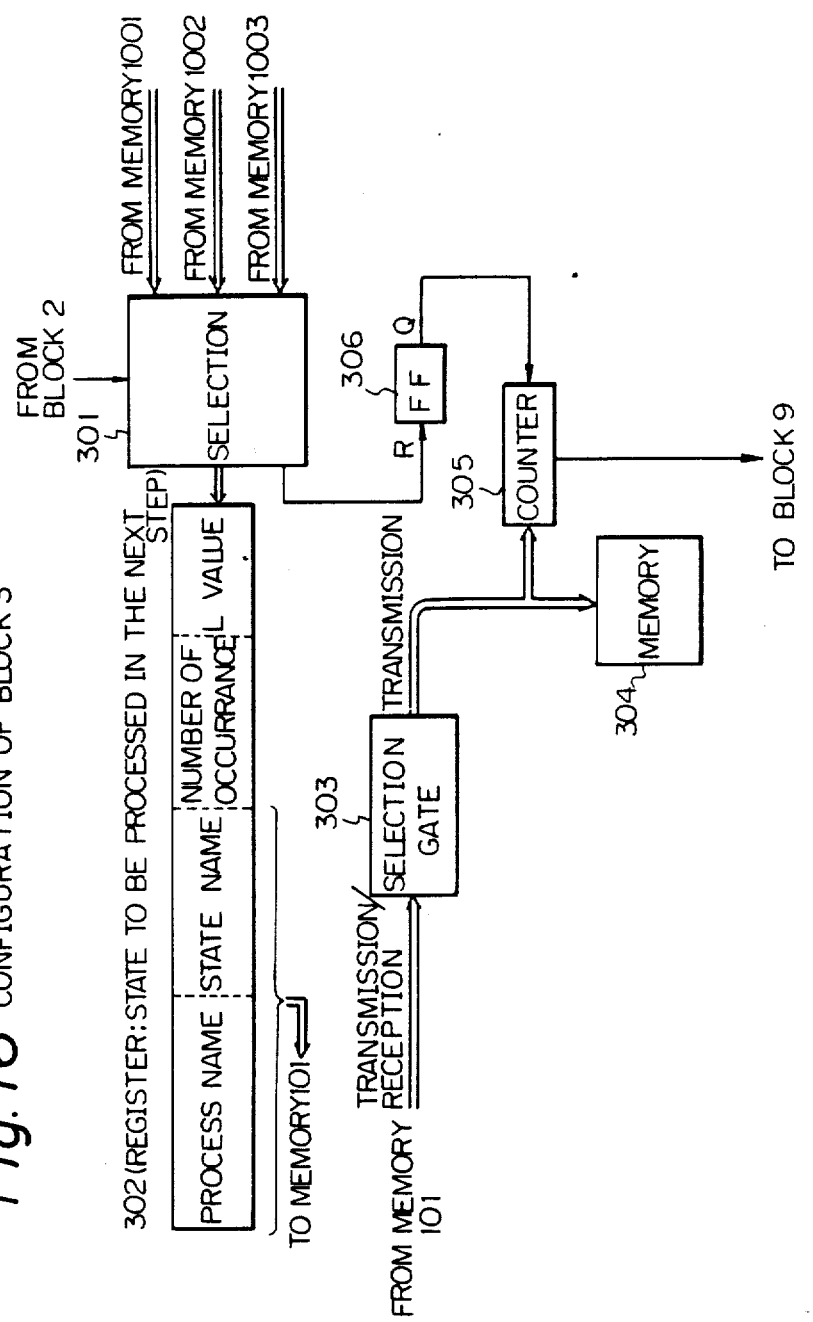

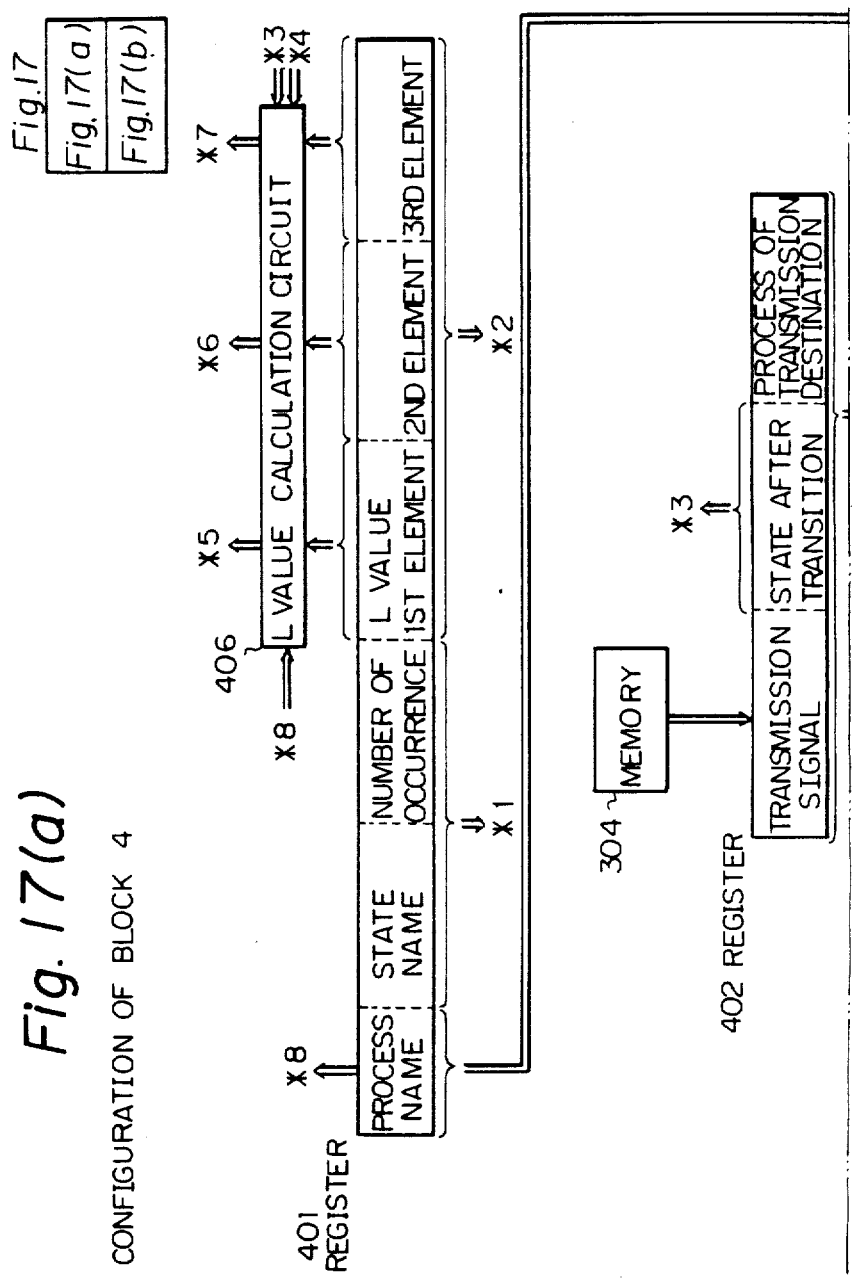

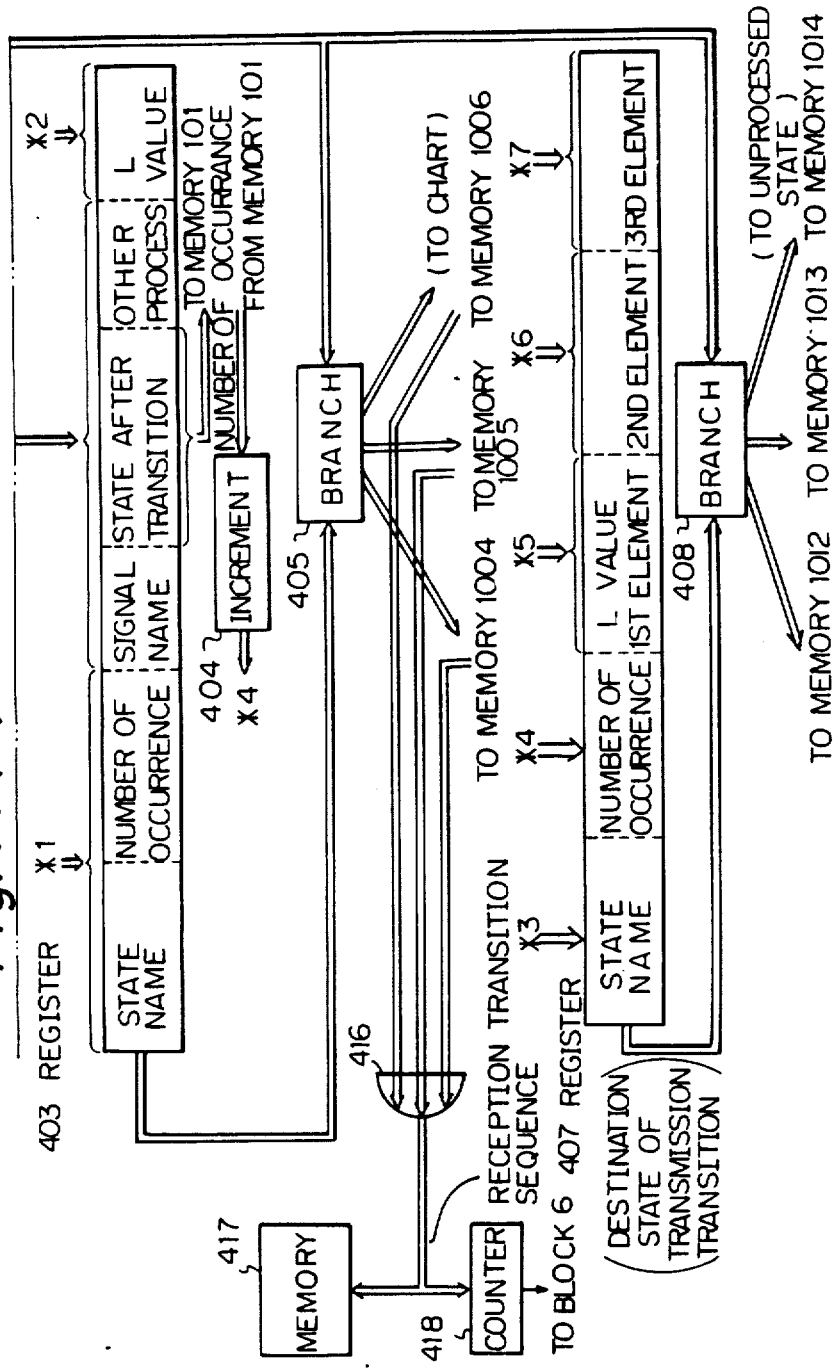

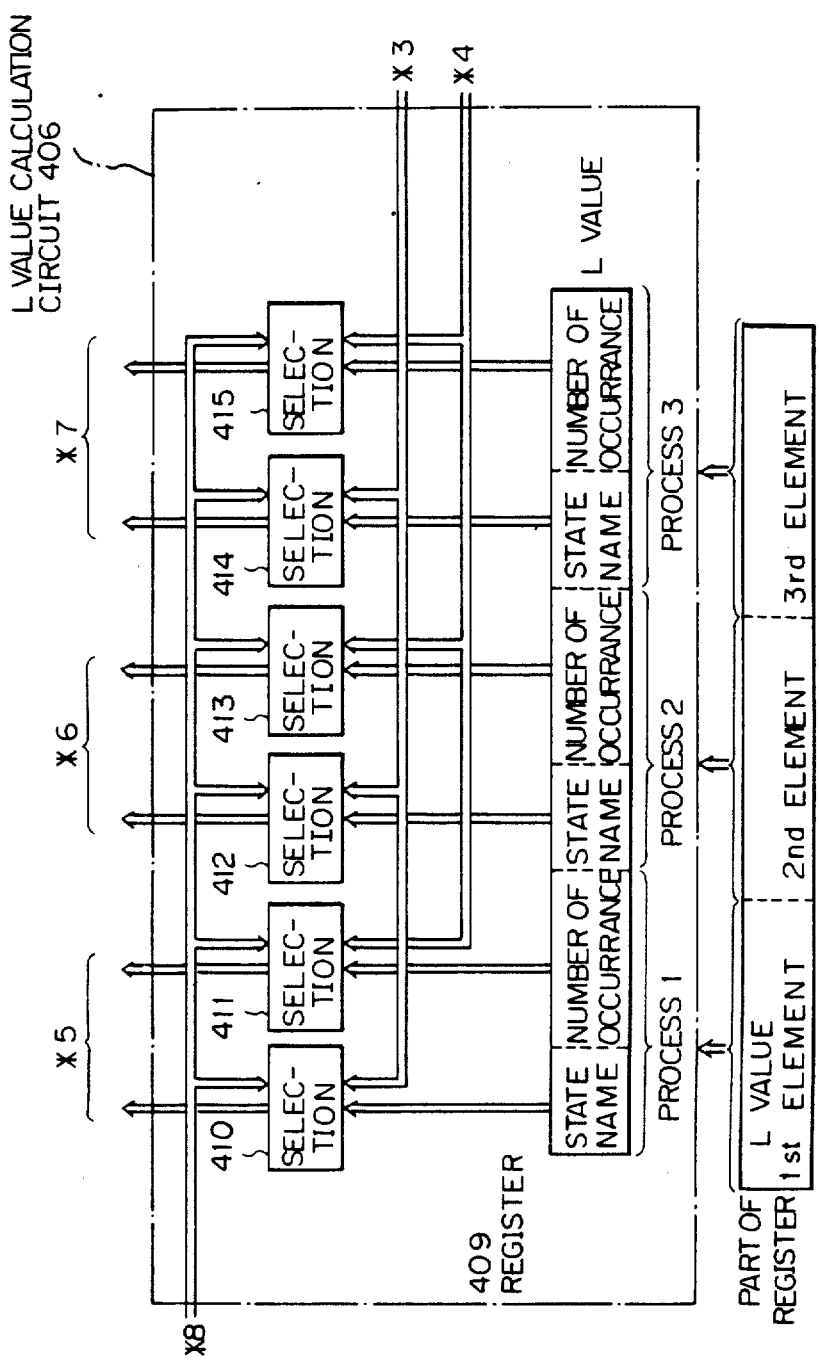

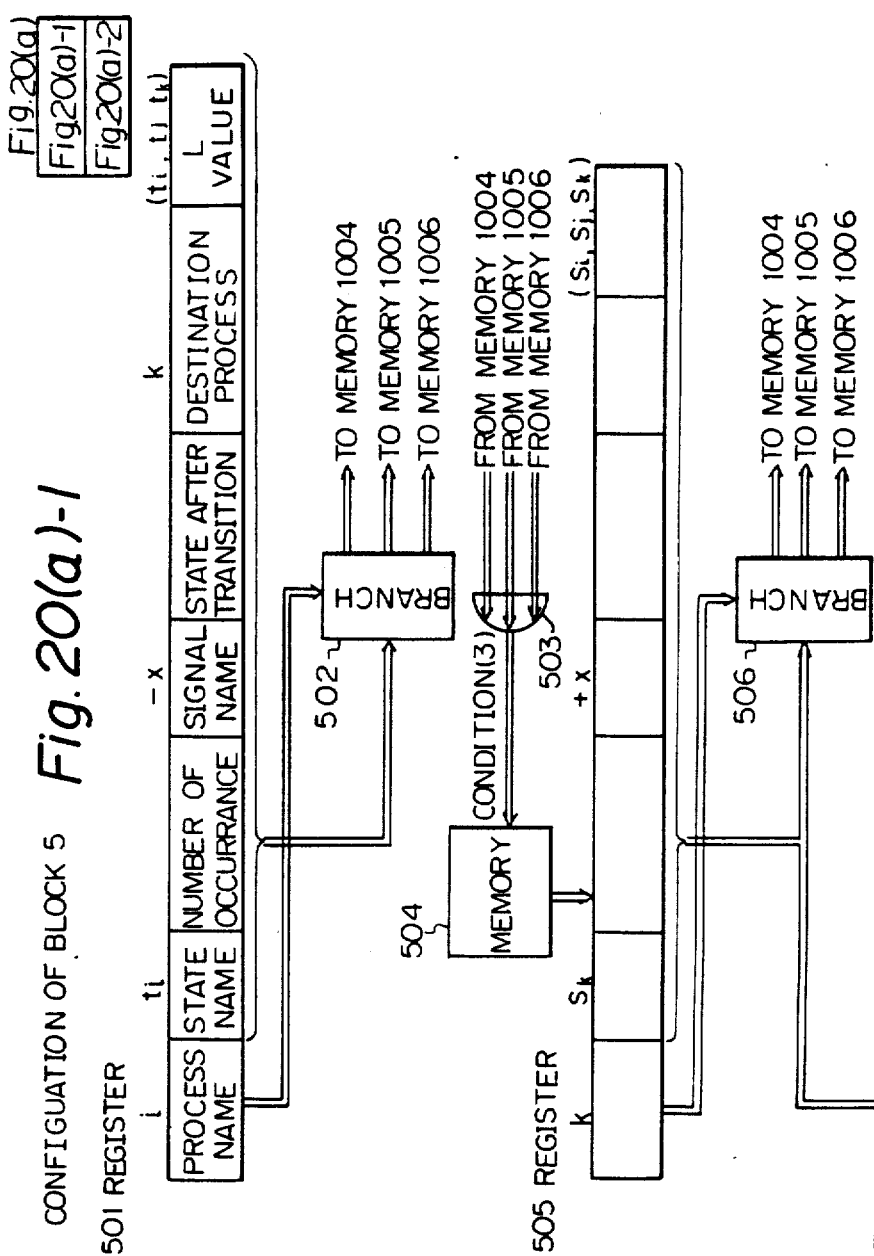

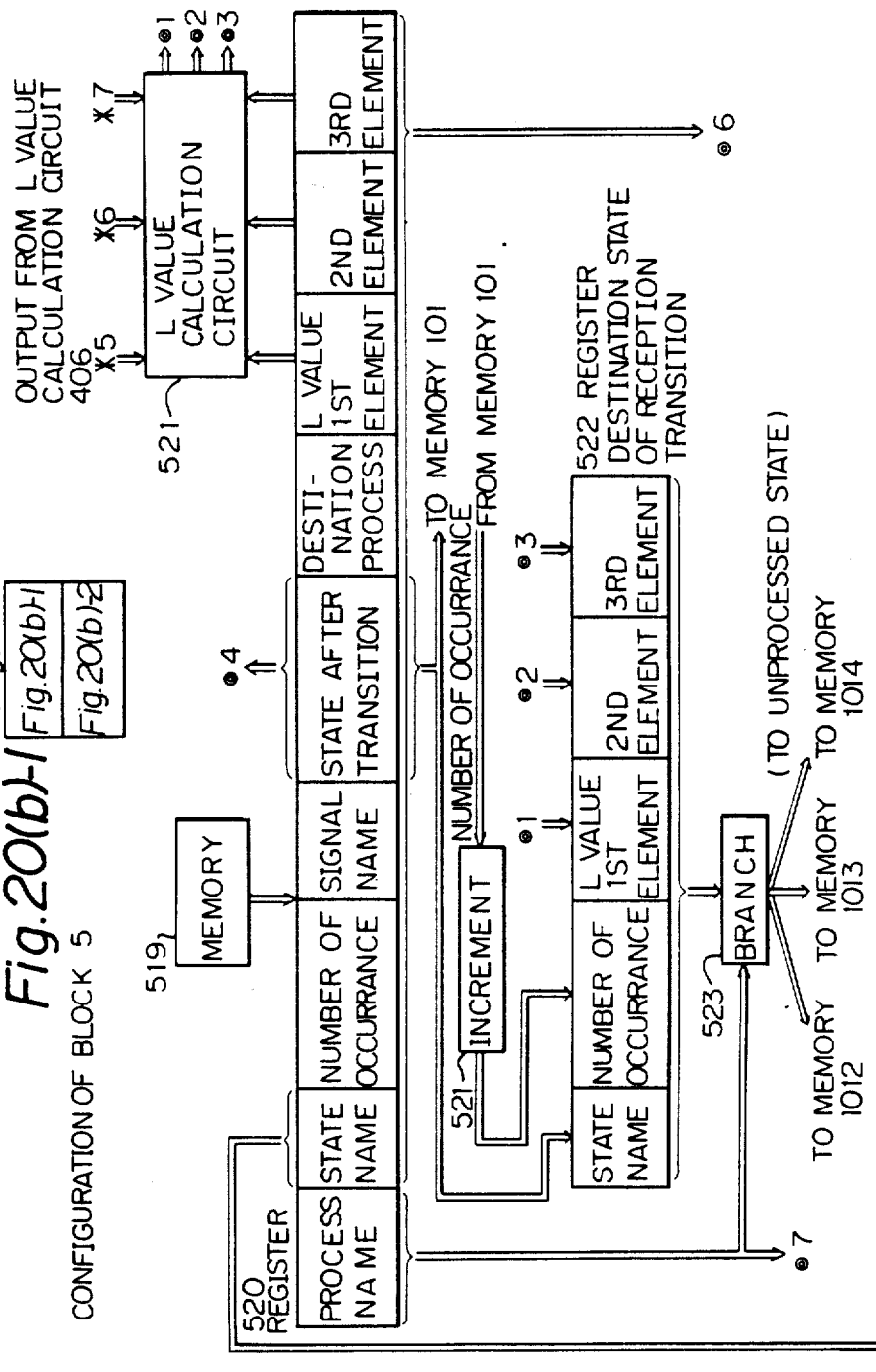

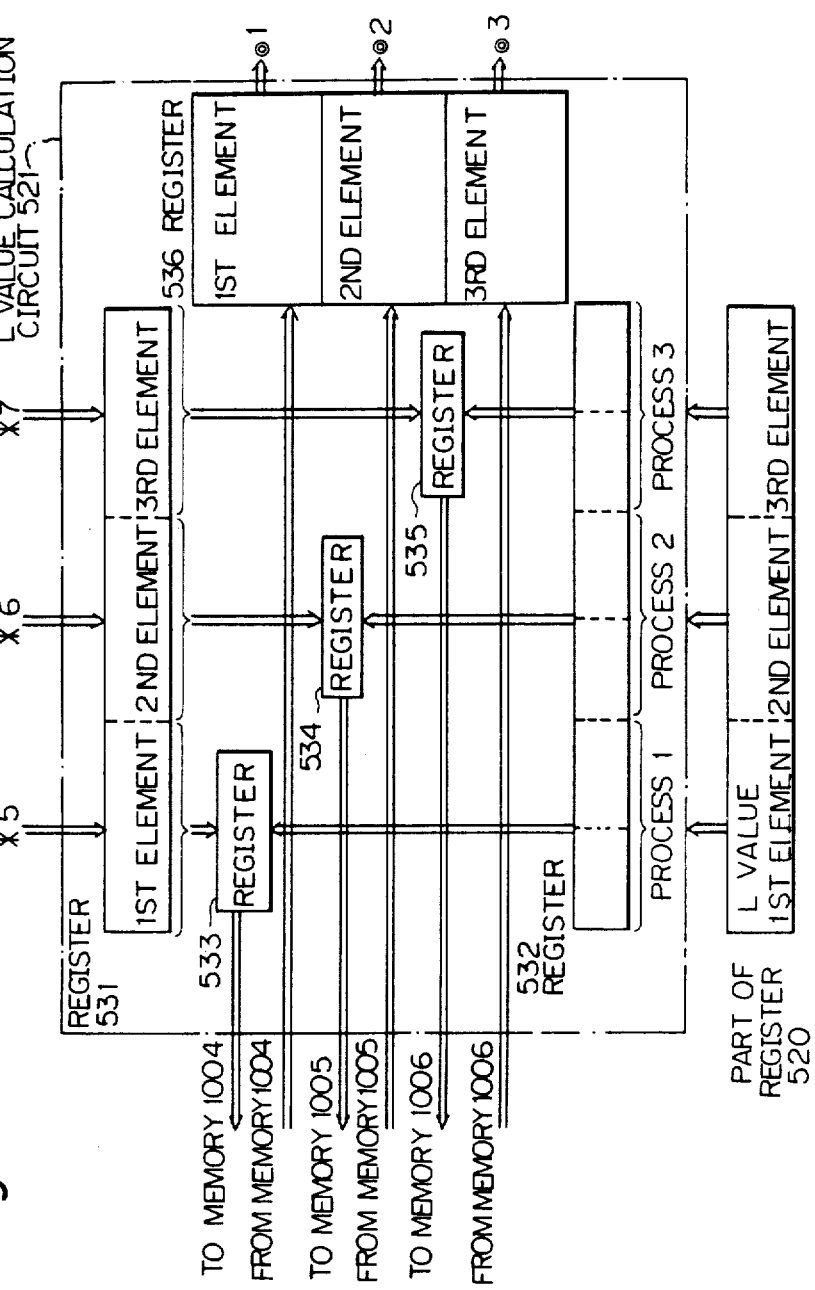

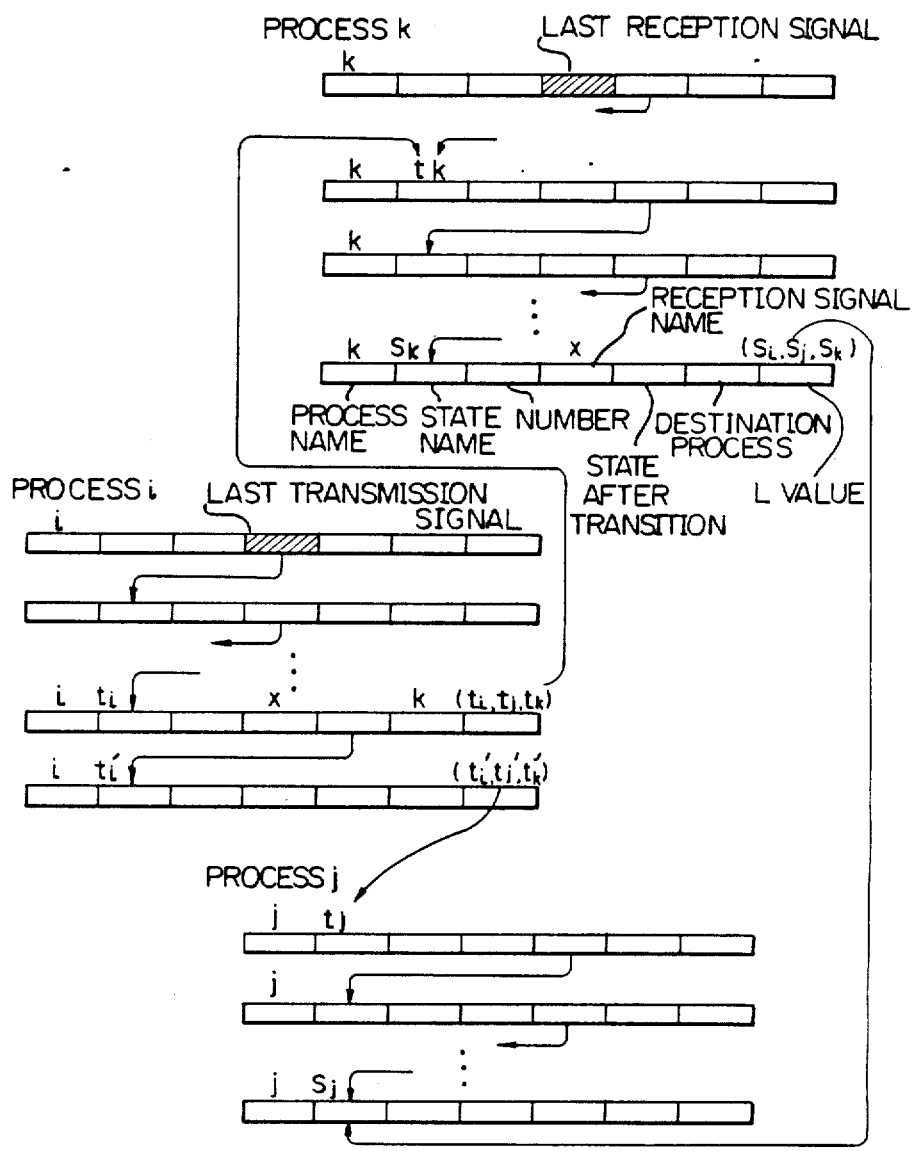
Fig. 22 INFORMATION EXTRACTION METHOD BASED ON NECESSARY AND SUFFICIENT CONDITION IN BLOCK 5

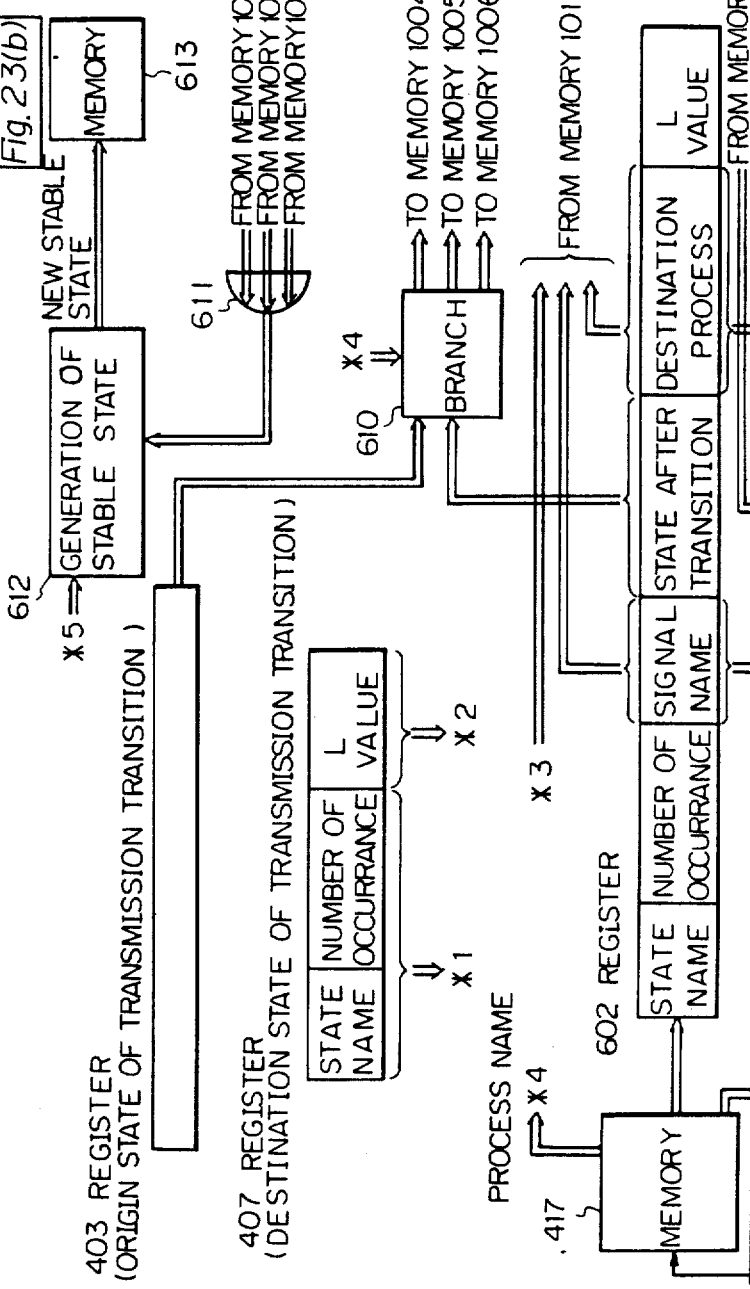

Fig. 24 CONFIGURATION OF BLOCK 7
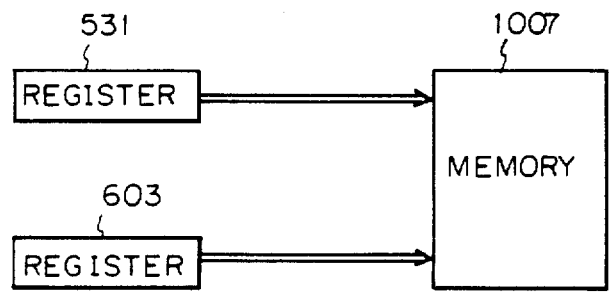
Fig. 25 CONFIGURATION OF BLOCK 8
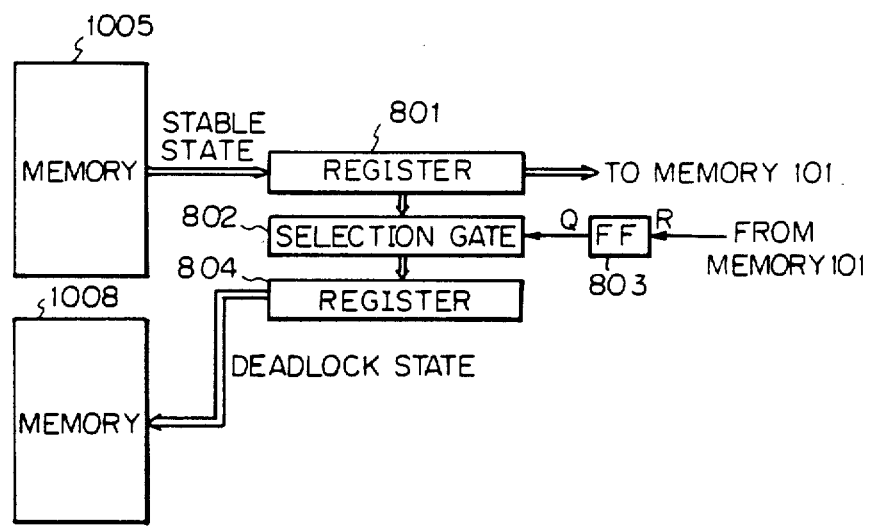

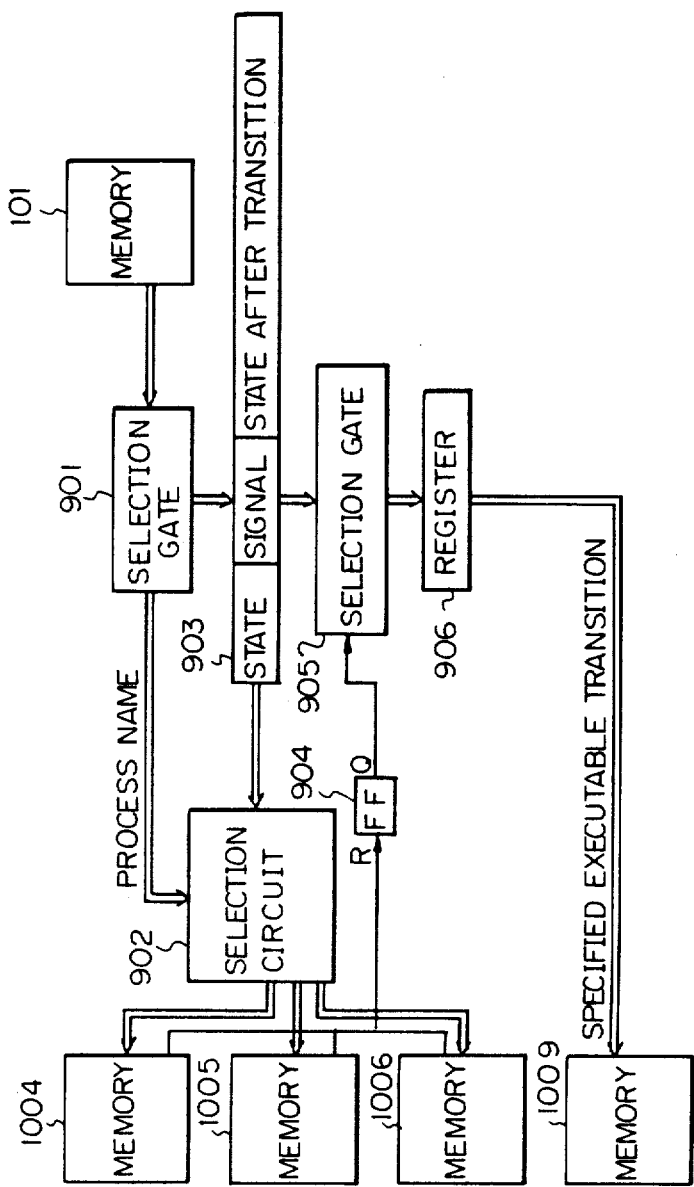
Fig. 26 CONFIGURATION OF BLOCK 9

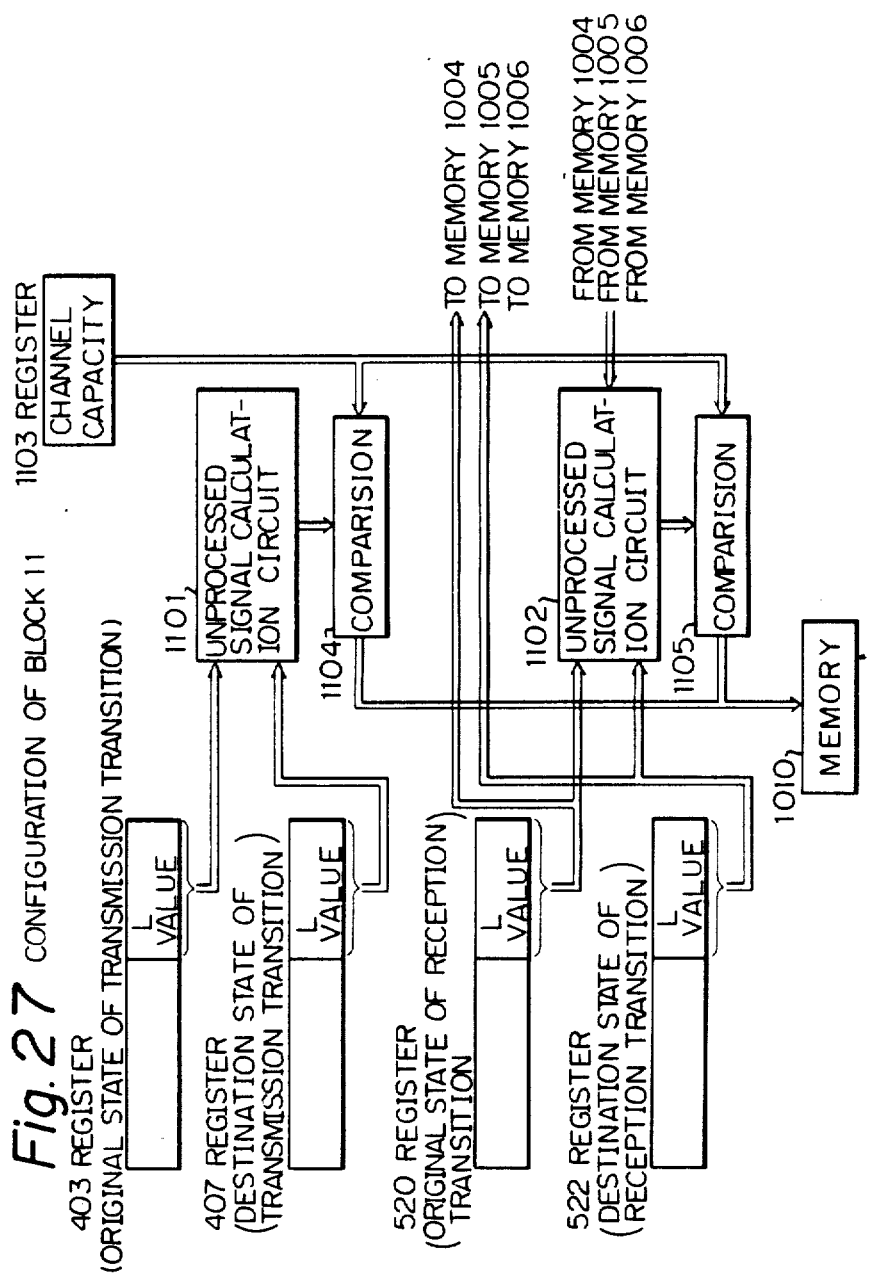

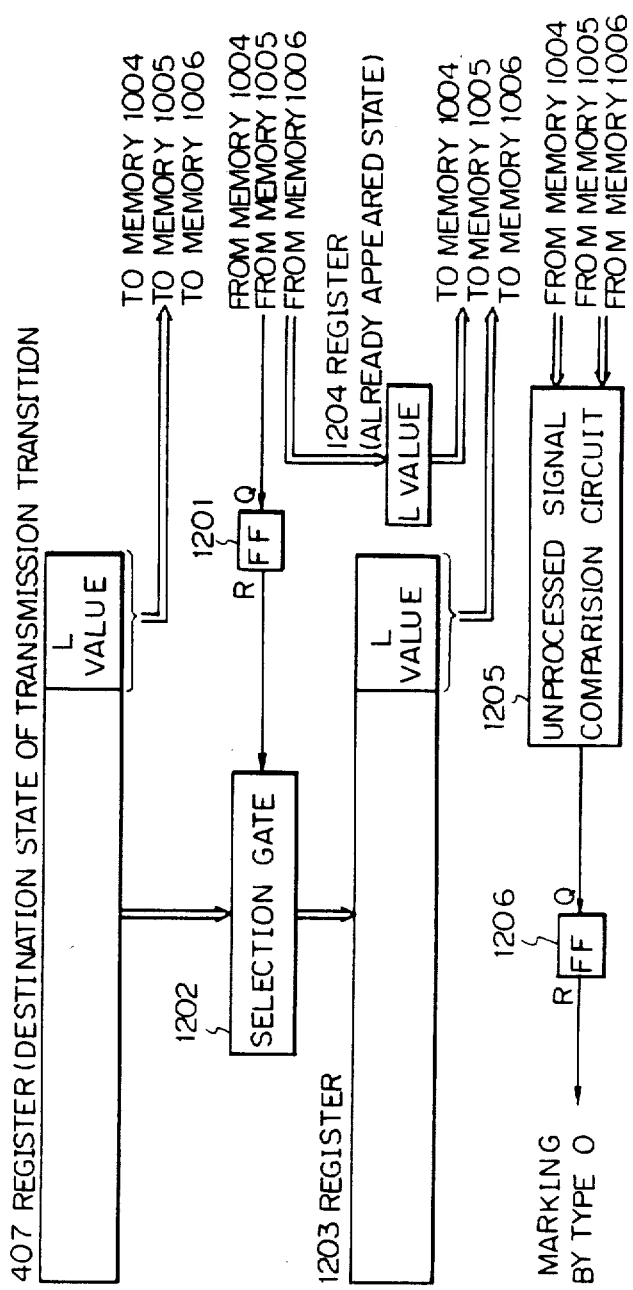
Fig. 28(a) CONFIGURATION OF SUBBLOCK OF EXPANSION STOP BY TYPE 0 IN BLOCK 12

CONFIGURATION OF SUBBLOCK OF EXPANSION STOP BY TYPE 1 IN BLOCK 12

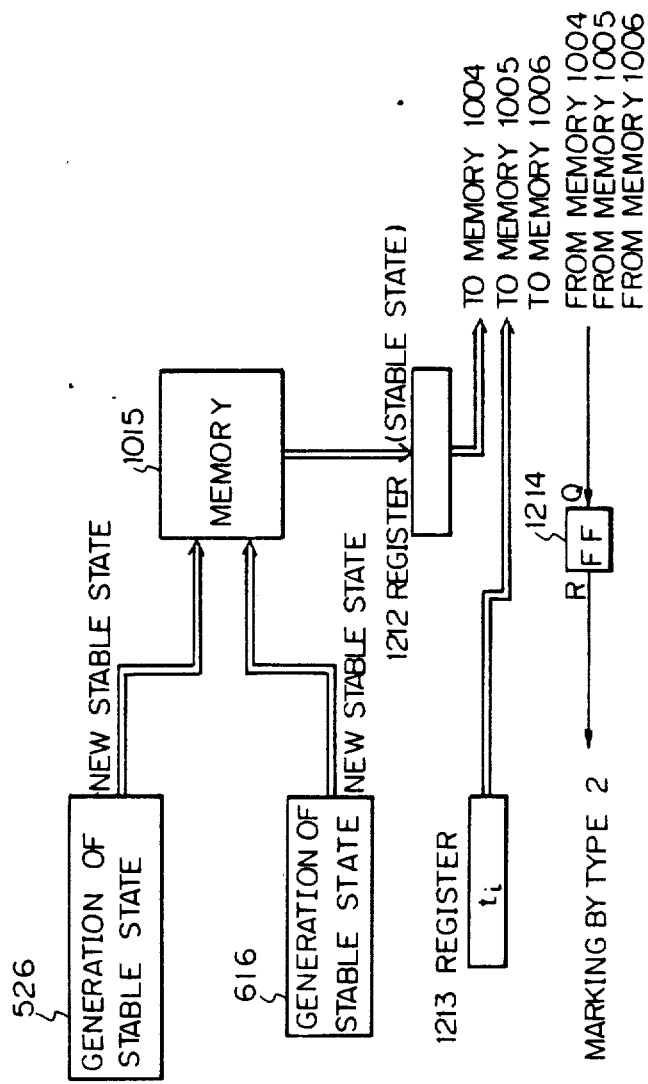
Fig. 28(c) CONFIGURATION OF SUBBLOCK OF EXPANSION STOP BY TYPE 2 IN BLOCK 12

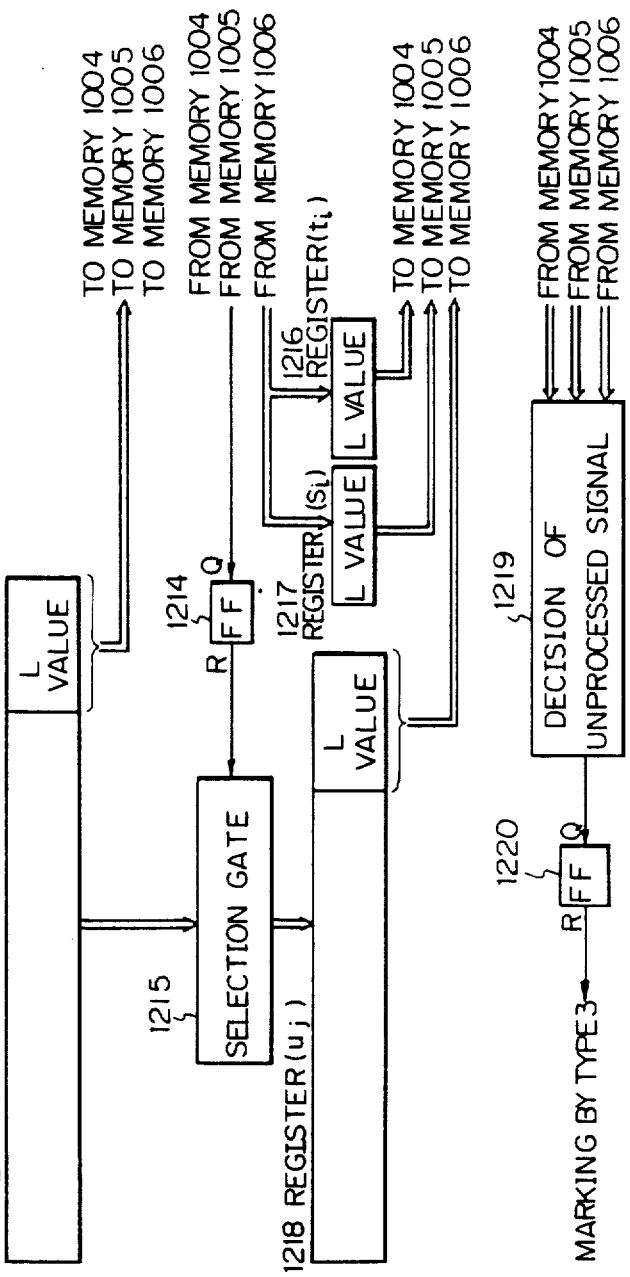
Fig. 28(d) CONFIGURATION OF UNBOUNDED OVERFLOW DETECTION SUBBLOCK IN BLOCK 12

PROTOCOL VALIDATION SYSTEM

BACKGROUND OF THE INVENTION

The present invention relates to a protocol validation system which receives a specification of a communications protocol, detects an error in the protocol specification and provides a data for correcting the error.

A protocol is a communication agreement among a plurality of communication apparatuses such as an electronic exchange system or terminal system, or among a plurality of logic modules in a communication apparatus. A protocol specification has become complicated, following the latest development of communication technology.

A large scale of software is usually produced by dividing a program into some modules and then combining those modules to achieve a given operation. In this case, a protocol specification must be designed so that there are no errors in a protocol defined between plural modules. Thus, it has become important to design a system such that some communication apparatuses or processes are associated with one another to achieve a given purpose.

In order to establish a design manner of such a system, it is required to clearly describe a requested specification of a protocol specification and then validate whether there is an error in the requested specification or not. An error or redundancy in the requested specification can be removed by analyzing an informal request for a protocol specification and then describing the requested specification formally. Thus, removal of an error or redundancy makes it possible to show a protocol specification clearly and to test it automatically. If a software designer detects an error in a protocol specification at the stage of its design, operation fed back from the development or maintenance stage of a software to the design stage of a protocol specification would be avoided. Therefore, the detection of an error at the design stage of a protocol specification makes it possible to enhance productivity of software.

Recently, two types of protocol validation systems have been reported.

One prior validation system is such that for a protocol having a plurality of processes, a system state is defined as the combination of a state of each process and a state on each channel between processes, and all the states reachable from an initial state are enumerated, or subsets necessary to detect validity items are enumerated—see, for example, C. H. West, "General technique for communications protocol validation", IBM J. Res, Devel., July 1978.

Alternatively, the other type of a prior validation system is such that all the system states are not enumerated, but an excutable state transition provided by transmission or reception of one signal in each process is expanded like a tree in accordance with a condition which regulates that a message is transmitable or receivable at a state in each process, and that an error is found on a process of expansition; for example, D. Brand and P. Zafiropulo, "On communicating finite-state machine", IBM Res. Rep. RZ1053, 1981.

The present invention relates to the latter type of protocol validation system in which validity is effected for each process. Therefore, this type of prior protocol validation system will be now described below, referring to FIGS. 1 and 2. FIG. 1 shows an example of a protocol to be tested. This protocol is a communication system with processes 1, 2 and 3. Each of the processes 1 and 3 may be a terminal apparatus and process 2 may be an exchange system, or all the processes 1, 2 and 3 may be included in a single CPU. A process is defined as a processing unit which performs a signal transmission and/or a signal reception between the other processes of different functions. A communication system is composed of a plurality of processes. Therefore, the protocol of FIG. 1 shows a communication system composed of three processes.

In FIG. 1, a circle shows a state of a process, and an arrow shows a state transition. Labels $-x$ and $+x$ attached to an arrow show transmission and reception of a signal x, respectively. An initial state of each process is 1. Therefore, it will be understood from FIG. 1 that the state of the process 1 changes from the initial state 1 to the state 2 when the process 1 sends a signal 1 to the process 2, or changes from 1 to 3 when it receives a signal 3 from the process 2, or changes from 1 to 2 when it receives a signal 6 from the process 3. Likewise, the other processes 2 and 3 operate. Although an operation of each process is simple, it is difficult to find a logical error in an operation between processes.

FIGS. 2($a$) through 2($c$) show a result obtained by applying the latter prior validation system mentioned above to the protocol of FIG. 1. FIGS. 2$a$), 2($b$) and 2($c$) show expansion of state transitions of the processes 1, 2 and 3, respectively, and are thus called a state transition expansion chart. A system state is shown by attaching to a state of one considered process states of other processes which must reach so that said state of said considered process is obtained. A set of those states is called a L value at a state in a considered process.

The description will be now given of a drawing manner of a state transition expansion chart as well as a calculation manner of a L value at each state for the protocol of FIG. 1. Although a state name and a signal name use those shown in FIG. 1 for convenience in the following description, in order to distinguish a state name or a signal name which appear more than two times from those which appear first, after ".", the numeral 0 is provided when those appear first, the numeral 1 is provided when those appear secondly, the numeral 2 is provided when those appear thirdly, and so on. For example, 2.1 shows the state 2 which appears secondly, or the signal 2 which appears secondly. Thus, such a numeral after "." suggests the number of times a state or a signal occurs.

First, the initial state of each process is 1, and thus (1.0) is drawn for each process and the L value at the state 1 of each process is initiated as (1.0 1.0 1.0). For example, in the L value (1.0 1.0 1.0) at the state 1.0 of the process 1, the first element 1.0 shows that the state of the process 1 itself is 1, the second element 1.0 shows that the process 1 knows that the state of the process 2 is 1, and the third element 1.0 shows that the process 1 knows that the state of the process 3 is 1. At this time, an executable transmission transition is $-1$ in the process 1 or $-3$ in the process 2. For execution of the transmission transition $-1$ in the process 1, an arrow with the label $-1.0$ and (2.0) are drawn as shown in FIG. 2($a$). The L value at the state 2.0 of the process 1 is set as (2.0 1.0 1.0), because the process 1 does not know changes of states of the processes 2 and 3 corresponding to the transmission of the signal 1.0. The first element of that L value shows the state of the process 1 itself is 2. The reception transition $+1.0$ in the process 2 corresponding to the transmission transition −1.0 is then executed. For this execution, an arrow with the label +1.0 and ②.⓪ is drawn as shown in FIG. 2(b). The process 2 can know that the state of the process 1 is 2 by the reception of the signal 1.0. However, the process 2 does not know a change of a state of the process 3, and thus the L value at the state 2.0 of the process 2 is set as (2.0 2.0 1.0), in which the second element 2.0 shows that the state of the process 2 itself is 2.

For execution of the transmission transition −3 in the process 2, an arrow with the label −3.0 and ③.⓪ are drawn as shown in FIG. 2(b). The L value at the state 3.0 of the process 2 is provided as (1.0 3.0 1.0), since the process 2 does not know change of states in the processes 1 and 3 resulting from the transmission of the signal 3.0. At this time, the process 2 recognizes that the state of the process 1 after execution of this transmission transition −3.0 is 1. It is thus understood that the transmission transition −1.0 in the process 1 is executable at the state 1.0 of the process 1, and thus the reception transition +1.0 corresponding to that transmission transition −1.0 is executable at the state 3.0 of the process 2. Therefore, it is tried to draw an arrow with the label +1.0 at the state 3.0. However, as is apparent from FIG. 1, the reception transition +1 is not defined, but executable at the state 3 of the process 2. As a result, the reception transition +1.0 at the state 3.0 of the process 2 is detected as an unspecified executable transition. This unspecified executable transition is indicated, as shown in FIG. 2(b), by a dotted arrow with the label +1.0 in the chart.

Next, the reception transition +3.0 in the process 1 corresponding to the transmission transition −3.0 in the process 2 is executed. For this execution, an arrow with the label +3.0 and 3.0 are drawn as shown in FIG. 2(a). Then process 1 does not know a change of a state in the process 3. Therefore, the L value at the state 3.0 of the process 1 is (3.0 3.0 1.0), in which the first element 3.0 shows that the state of the process 1 itself is 3. At this system state, it is understood that the state 2.0 of the process 1 can receive the signal 3.0 sent from the process 2, since the transmission transition −1.0 from the state 1.0 to the state 2.0 in the process 2 has already been executed. Thus, it is tried to draw an arrow with the label 3.0 at the state 2.0 of the process 1. However, the reception transition +3 is not defined at the state 2 of the process 1 in the protocol of FIG. 1. Therefore, this reception transition +3.0 is detected as an unspecified executable transition and is then drawn by a dotted arrow with the label +3.0 as shown in FIG. 2(a).

At this time, executable transmission transitions are −2, −5 in the process 1 and −4 in the process 2. For execution of the transmission transition −5 in the process 1, an arrow with the label −5.0 and ④.⓪ are drawn as shown in FIG. 2(a). The L value at this state is provided as (4.0 1.0 1.0). The reception transition +5.0 in the process 3 corresponding to the transmission transition −5.0 in the process 1 is then executed. For this execution, an arrow with the label +5.0 and ②.⓪ are drawn as shown in FIG. 2(c). The L value at this state is (4.0 1.0 2.0). At this time, the transmission transition −6 in the process 3 is executable. For this execution, an arrow with the label −6.0 and ①.① are drawn as shown in FIG. 2(c). The L value at this state is (4.0 1.0 1.1). It will be understood that at this time, states of the processes 1, 2 and 3 are 4.0, 2.0 and 1.1, respectively, and that no signal on channels exists (, which means all the transmission signals have been received), and no executable transmission transition and no executable reception transition exist. Such a system state is detected as a deadlock. It should be noted that the state of the process 2 is not 1.0 which is shown in that L value but 2.0, because the reception transition +1.0 in the process 2, which correspondings to the transmission transition −1.0 in the process 1, has already executed. Further, at the state 4.1 of the process 1, the reception transition +6 is never executed, unless the transmission transition −6 in the process 3 is executed. Therefore, it is understood that in expansion of state transitions mentioned above, the reception transition +6 expanded in sequence from the state 1.0 of the process 1 is unexecutable, or is never executed. Such a state transition is detected as a specified unexecutable transition.

According to the above-mentioned manner, state transitions in each process are expanded, and thus the protocol of FIG. 1 is expanded as shown in FIGS. 2(a) through 2(c).

The description will be now given of a stop manner for stopping expansion of a state transition.

As shown in FIG. 2(a), the L value at the state 2.1 of the process 1 is (2.1 2.1 1.0) and the L value at the state 2.4 of the process 1 is (2.4 2.4 1.0). That is, two system states are the same. It is thus understood that state transitions −2, +4 between states 2.1 and 2.4 of the process 1 are repeated from the state 2.4. As a result, expansion is stopped at the state 2.4. As mentioned later, at this time we say that the state 2.4 is marked by type 1. Likewise, expansion is stopped at the states 2.6, 4.1, 4.3, 4.5, 4.7 and 4.8 in the process 1, as well as the states 3.4 and 3.6 in the process 2.

The state 3.4 in the process 1 can receive only the signal 4 which is sent from the state 3.4 in the process 2. However, the expansion from the state 3.4 of the process 2 has been already stopped. Thus, the expansion from the state 3.4 of the process 1 is stopped. As mentioned later, at this time, we say that the state 3.4 of the proces 1 is marked by type 1. Likewise, the expansion from the state 2.4 in the process 2 is stopped.

The expansion from the state 1.1 of the process 3 is stopped, since the state 4.1 of the process 1, the state 2.0 of the process 2 and the state 1.1 of the process 3 are a deadlock state. Likewise, the expansions from the states 1.2, 1.3, 1.4 and 1.5 of the process 3 are stopped.

However, a prior protocol validation system thus describes has the disadvantage that a large amount of handling time makes difficult the validity test, when a protocol is large and complicated with many states and transitions, since all the state transition sequences in each process are enumerated and the conditions for stopping the expansion are not severe. The prior system has another disadvantage that it has not been implemented by hardware yet, because it needs a large scale of memory for storing the state transition chart.

SUMMARY OF THE INVENTION

An object of the present invention is to overcome the disadvantages of the prior protocol validation systems by a new improved protocol validation system.

A further object of the invention is to reduce time and memory capacity required for a protocol validation.

A still further object of the invention is to provide acyclic expansion of a state transition in order to avoid redundant expansion.

A still further object of the invention is to provide new validity items to reduce memory capaicty and channel capacity.

A still further object of the invention is to provide new conditions for stopping expansion of a state transition to reduce redundant expansion.

A still further object of the invention is to implement protocol validation system by a hardware.

The above and other objects are attained by a protocol validation system which receives a protocol specification having a plurality of processes in a form of an electrical signal, and tests said protocol specification by expanding a state transition in each process in accordance with transition information of said protocol specification, to find errors of said protocol specification and deliver errors in the form of an electrical signal characterized in that said system comprises; (a) a memory for storing said protocol specification which is subject to validation, (b) first means for expanding a transmission transition and a corresponding reception transition for each process, and monitoring a system state composed of a state in each process and a signal state on a channel between processes, (c) second means for detecting an unspecified executable transition and a deadlock state in accordance with a predetermined condition during expansion of a transition, (d) third means for detecting a bounded overflow which is a system state such that the number of signals on a channel between processes exceeds a given channel capacity, (e) fourth means for detecting a specified unexecutable transition after finishing of expansion, and (f) fifth means for stopping expansion in accordance with a predetermined condition.

Preferably, the system mentioned above further comprises means for detecting an unbounded overflow which is a system state such that the number of signals on a channel at a certain system state is intended to increase infinitely at an other system state which follows said certain system state and which is identical with said certain system state.

BRIEF DESCRIPTION OF THE DRAWINGS

The foregoing and other objects, features, and attendant advantages of the present invention will be appreciated as the same become better understood by means of the following description and accompaning drawings wherein:

FIGS. 2(a) through 2(c) are prior state transition expansion charts,

FIG. 3 comprising FIGS. 3(a) and 3(b) is a block diagram of the embodiment of the present invention, FIGS. 4(a) and 4(b) show an example of format of the memory 1 in FIG. 3, FIGS. 5(a) though 5(f) show examples of errors which are detected by applying the present embodiment to the protocol of FIG. 1, FIGS. 6(1) through 6(d) are state transition expansion charts obtained by the present invention, FIGS. 7(a) through (c) show validation of an overflow state, FIG. 13 shows a configuration of the memory 1 in FIG. 3, FIGS. 14, 14(a) and 14(b) show a configuration of the memory 10 in FIG. 3, FIG. 15 shows a configuration of the block 2 in FIG. 3, FIG. 16 shows a configuration of the block 3 in FIG. 3

FIGS. 17, 17(a) and 17(b) show a configuration of the block 4 in FIG. 3,

FIG. 18 shows a configuration of the L value calculation circuit 406 in FIG. 17, FIG. 19 shows extraction of reception transition sequence, FIGS. 20(a), 20(a)-1, 20(a)-2 and 20(b), 20(b)-1, 20(b)-2 show a configuration of the block 5 in FIG. 3, FIG. 21 shows a configuration of the L value calculation circuit 521 in FIG. 20(b), FIG. 22 shows an information extraction manner based on necessary and sufficient condition in block 5, FIGS. 23, 23(a) and 23(b) show a configuration of the block 6 in FIG. 3, FIG. 24 shows a configuration of the block 7 in FIG. 3, FIG. 25 shows a configuration of the block 8 in FIG. 3, FIG. 26 shows a configuration of the block 9 in FIG. 3, FIG. 27 shows a configuration of the block 11 in FIG. 3, and FIGS. 28(a) through 28(d) show a configuration of the block 12 in FIG. 3.

DESCRIPTION OF THE PREFERRED ENBODIMENTS

Figure 1:
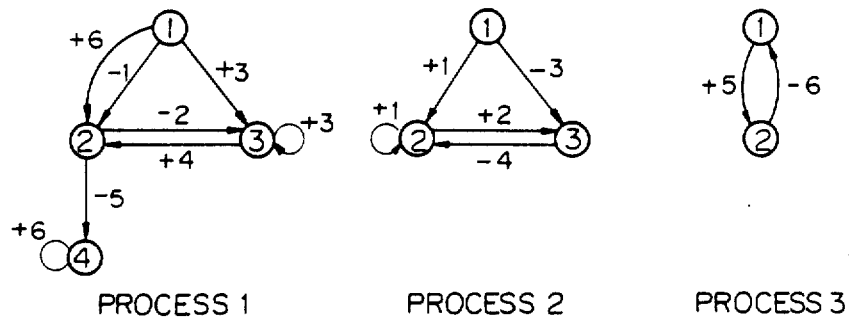
FIG. 1 is an example of a protocol to be tested.

It is assumed in the following description that protocols shown in FIGS. 1 and 9 are used as examples of the explanation of the present invention.

First, some terminology and assumptions used in the present text are shown below.

A protocol is expressed by the combination of four items $P=(Q, o, M, succ)$ where $Q=(Q_1, —, Q_N)$, $o=(o_1, —, o_N)$, $M=(M_{11}, —, M_{NN})$ and succ is a partial function of $Q_i x(M_{ij} \cup M_{ji}) \rightarrow Q_i (1 \leq i \leq N, 1 \leq j \leq N)$; $Q_i \neq \phi$, $Q_i \cap Q_j = \phi$ and $M_{ij} = \phi$ for any $i,j(i \neq j)$, and $M_{ij} \cap M_{kl} = \phi$ for any $i, j, k, l$ ($I \neq k$, $j \neq l$).

N; the number of processes which are composed of protocol P, $Q_i$; state set of process i, $o_i \epsilon Q_i$; initial state set of process i, $M_{ij}$; set of signals transmitted from the process i through the channel (i,j) to the process j, and $succ(s_i, x) = t_i(s_i \epsilon Q_i, t_i \epsilon Q_i)$; a state transition, that is, when $x \epsilon M_{ij}$ the state $s_i$ changes to the state $t_i$ by transmission of the signal x at the state $s_i$, alternatively when $x \epsilon M_{ji}$ the state $s_j$ changes to the state $t_i$ by reception of the signal x at the state $s_i$.

A protocol is described by communicating finite-state machine, and is expressed by N-tuple set $P=(H_1, —, H_N)$. A set $V_i$ of nodes is $V_i = Q_i$, and a set $E_i (c V_i x V_j)$ of directed edges is defined such as the following; only when $s_i \epsilon Q_i$, $t_i \epsilon Q_i$, $x \epsilon M_{ij} \cup M_{ji}$, and succ $(s_i, x) = t_i$, $(s_i, t_i) \epsilon E_i$. Further, when $x \epsilon M_{ij}$ for each of $(s_i, t_i) \epsilon E_i$, the label $-x$ is used, and when $x \epsilon M_{ji}$ for each of $(s_i, t_i) \epsilon E_i$, the label $+x$ is used, where $V_i$ is a state of the process i, $E_i$ is a state transition in the process i, and $-x$ and $+x$ are a transmission and reception of signal x, respectively.

The following assumptions are taken for a protocol to be tested.

(1) Time necessary for transmitting a signal from one process to the other process is a finite non-negative value.

(2) A state transition in a process is deterministic and time necessary for executing that state transition is zero.

(3) A reception signal sequence of a signal between processes is the same as a transmission signal sequence.

A global state of protocol P is expressed by two-tuple set G (S,C) where S=($s_1$, —, $s_N$), $s_i \epsilon Q_i$ ($1 \leq i \leq N$), C=($c_{11}$, —, $c_{NN}$) and $c_{ij} \epsilon M_{ij}^*$. $c_{ij} \epsilon M_{ij}^*$ shows $c_{ij}$=-$\epsilon$(empty sequence) or $$\underbrace{c_{ij} \epsilon M_{ij} x \cdots x M_{ij}}_{n \text{ numbers}}$$

($n \geq 1$). In this case, S shows a state of each process, and C shows a sequence of signals remaining on each channel between processes.

A global state shows a system state. $c_{ij} = x_1. —.x_m$ shows a signal sequence which has been transmitted from the process i to the process j, but has not been received yet by the process j. The mark "." shows a concatenation of a signal sequence.

A transmission sequence in the process i and a reception sequence in the process j are order of $x_1.—.x_m$ from its left side. For all $i(1 \leq i \leq N)$, $c_{ii} = \epsilon$ by $M_{ii} = \phi$. In the following explanation, each signal in such a signal sequence is called an unprocessed signal on channel (i,j).

A 2-tuple relation ⊢ is defined on a set of G. Now, suppose that G=(S,C), S=($s_1$, —, $s_N$), C=($c_{11}$, —, $c_{NN}$), G'=(S',C'), S'=($s'_1$, —, $s'_N$) and C'=($c'_{11}$, —, $c'_{NN}$). The necessary and sufficient condition of G ⊢ G' is such that there exist processes i, j as well as a message x which satisfy the following condition (1) or (2).

(1) For a single i, j, $s'_i$=succ($s_i$, x) and $c'_{ij}$=$c_{ij}$·x ($s_i$, $s'_i \epsilon Q_i$; $x \epsilon M_{ij}$; $c_{ij}$, $c'_{ij} \epsilon M_{ij}^*$) where other elements in G are the same as corresponding elements in G'. When this condition (1) is satisfied, we say that the signal x is inserted into the channel (i,j). (2) For a single i, j, $s_j$=succ ($s_j$, x) and $c_{ij}$=x·$c'_{ij}$ ($s_j$, $s'_j \epsilon Q_j$; $x \epsilon M_{ji}$; $c_{ji}$, $c'_{ij} \epsilon M_{ij}^*$).

Each of the conditions (1) and (2) show that the state of the processes i, j changes from $s_i$, $s_j$ to $s_i'$, $s_j'$, respectively, and that the state on the channel (i, j) changes from $c_{ij}$ to $c_{ij}'$.

The necessary and sufficient condition of G ⊢* G' is G=$G^0$ ⊢ $G^1$ ⊢ — ⊢ $G^n$=G' for some n($n \geq 00$). ⊢* is a reflective and transitive closure of ⊢. That is to say, G ⊢* G for all G, and G ⊢* G" when G ⊢*G' and G' ⊢*G" where G, G' and G" are different from one another. When $G_s$ ⊢* G we say that G is reachable from $G_s$, and when $G_s$=$G_O$ we say that G is only reachable, where $G_O$=($S_O$, $C_O$), $S_O$=($o_1$, —, $o_N$) and $C_O$=($\epsilon$, —, $\epsilon$).

In protocol P, a sequential pair (s,x) in which $s \epsilon Q_i$, $x \epsilon M_{ij}$ is called a transmission pair, and a sequential pair (s,x) in which $s \epsilon Q_i$, $x \epsilon M_{ji}$ is called a reception pair. When the succ (s,x) is defined in protocol P, we say that (s,x) is specified. When G=(S,C), S=($s_1$, $s_1$, —, $s_i$, —, $s_N$), C=($c_{11}$, —, $c_{NN}$) is reachable, we say that the transmission pair ($s_i$, x), $x \epsilon M_{ij}$ is executable. When G=(S,C), S=($s_1$, —, $s_i$, —, $s_N$), C($c_{11}$, —, $c_{ji}$, —, $c_{NN}$) is reachable and also when $C_{ji}$=x·Y, $x \epsilon M_{ji}$, and $Y \epsilon M_{ji}^*$, we say that the reception pair ($s_i$, x) is executable.

G is called a stable global state, when G=(S,C) is reachable and there exist no signal on a channel such as the initial state or a state at which all signals have been processed by preceding state transitions.

Under preparation mentioned above, a protocol validation system according to the present invention detects the five validity items listed below.

(1) An unspecified executable transition; a reception transition which is not included in a protocol specification, but is executable.

(2) A specified unexecutable transition; a reception transition which is included in a protocol specification, but is unexecutable.

(3) A deadlock state; a system state such that state transitions in all processes are unexecutable, and there are no signals remaining on all the channels between processes which means a stable global state.

(4) A bounded overflow; a system state such that the number of signals stored on a channel between processes exceeds a predetermined capacity of said channel.

(5) An unbounded overflow; a system state such that the number of signals on a channel between processes is directed to increase infinitively.

The above validity items (4) and (5) are new ones provided according to this invention.

Figure 3B:
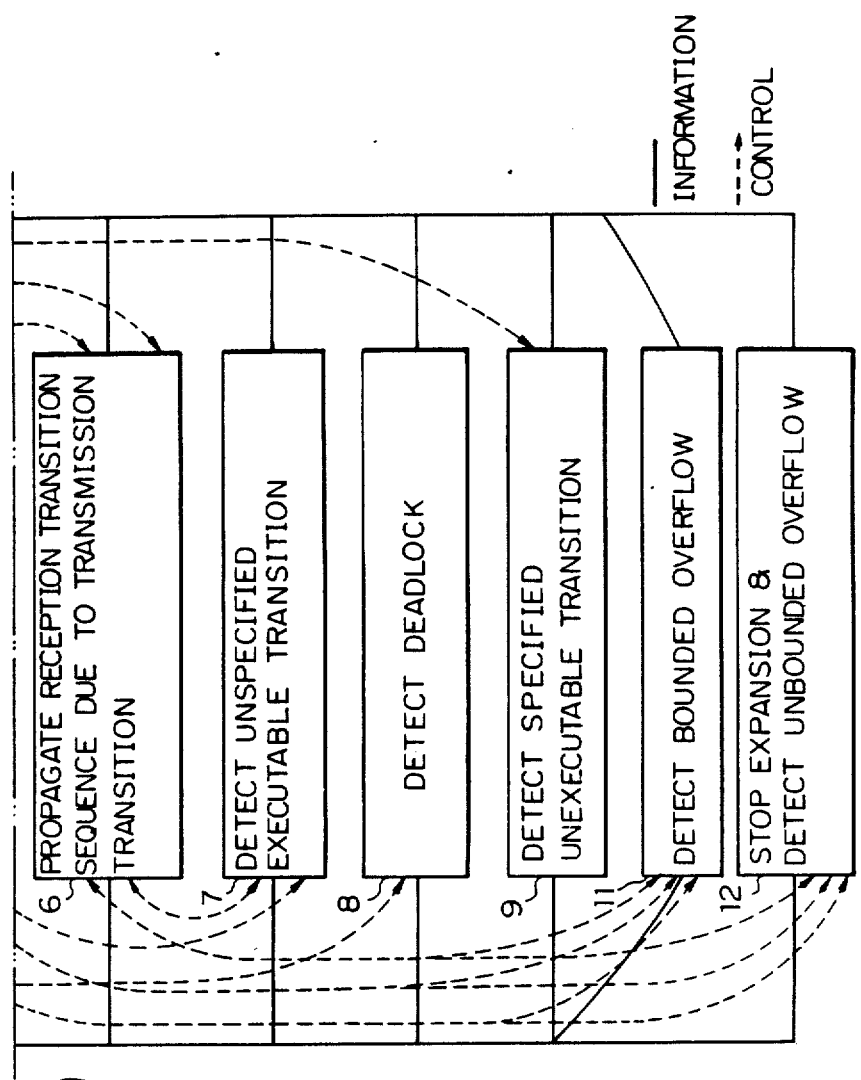

FIG. 3 is a block diagram of the embodiment of the present invention. In this figure, the numeral 1 is a memory which stores a protocol specification applied by an external circuit, 2 is an initial set block for initiating variables for the present validity process, 3 is a block for extracting an executable transition at an expanded state from the protocol stored in the memory 1, 4 is a block for drawing a new state and a new transition resulting from execution of said transmission transition in a expansion chart, calculating an L value at this state, and detecting whether it is possible to stop expansion at this state or not. The numeral 5 is a block for drawing in the chart a new state and a new reception transition resulting from execution of a reception transition corresponding to the transmission transition in block 4, calculating an L value at this state, and detecting whether it is possible to stop expansion at this state or not. The numeral 6 is a block for copying reception transition sequence which is executable at an original state of a transmission transition to a destination state of this transmission transition, drawing a new state and a new reception transition resulting from this copy in the chart, calculating an L value at this state, and detecting whether it is possible to stop expansion at this state or not. The numeral 7 is a block for detecting an unspecified executable transition upon processing in the blocks 5 and 6, 8 is a block for detecting a state which is a stable global state and at which no executable transmission transition exists, 9 is a block for detecting a state transition which is defined in a protocol specification, but does not appear in the chart, 11 is a block for detecting a bounded overflow, and 12 is a block for stopping acyclic expansion and detecting an unbounded overflow. The numeral 10 is a memory for storing a state transition expansion chart for each process and specification errors detected by the present validation test, as well as other valuables.

FIG. 4 shows a format when the protocol specification of FIG. 1 is stored in the memory 1. FIG. 5 shows a format when a state transition chart and error are stored in the memory 10 in the form of a table.

FIG. 6 is a state transition expansion chart obtained by applying the embodiment of FIG. 3 to the protocol of FIG. 1. The operation of FIG. 3 will be now described in the following explanation.

(Initial operation)

The protocol specification of FIG. 1 is stored, in advance of an initial operation, in the memory 1 in the storage form shown in FIGS. 4(a) and 4(b). First, the initial set block 2 operates. The block 2 accesses the memory 1, receives an initial state of each of the processes 1, 2 and 3 and makes a expansion chart by using the initial state and its L value of each process. In FIG. 6, the initial state 1.0 and its L value (1.0 1.0 1.0) are set for each process. A stable global state composed of the initial state of each process is recorded on a stable global state set V, such as V={(1.0 1.0 1.0)}.

(Detection of unspecified executable transition, specified executable transition and deadlock state)

Then, the blocks 3, 4 and 5 operates repeatedly. The block 6 is triggered by the block 4 or 5. An unspecified executable transition and a deadlock state are detected during expansion of a state transition by blocks 3, 4, 5 and 6. The block 7 is triggered by the block 5 or 6, and the block 8 is triggered by the block 3. After all the transitions are expanded, the block 9 starts to operate to detect a specified unexecutable transition.

First, the block 3 accesses the memory 1 and then extracts all transmission transitions executable at the initial state of each process. For the protocol of FIG. 1, the transmission transition $-1$ in the process 1 and the transmission transition $-3$ in the process 2 are extracted by the block 3. Now, assume that the transition $-1$ is selected. The block 4 is then triggered by the block 3. The block 4 expands the state 2.0 and the transmission transition $-1.0$ as shown in FIG. 6(a). Further, the block 4 calculates the L value at the state 2.0 as (2.0 1.0 1.0).

The calculation manner of an L value at a new state resulting from a transmission transition in process i is as follows. Assume that an original state of a transmission transition is $s_i$, and a destination state of this transmission transition is $t_i$. Also, assume that an L value at the state s is $(s_o, —, s_i, —, s_N)$. Then a L value at the state t is calculated as $(s_o, —, t_i, —, s_N)$, because when the process i reaches the states $t_i$, states of other processes do not change.

The operation is then transferred from the block 4 to the block 5, which looks for a reception transition which can receive the transmission transition $-1$ in the process 1.

An executable reception transition is obtained as follows. In the expansion chart, the necessary and sufficient conditions which regulate that the process k which is on the state $s_k$ can receive the signal x sent from the process i which is on the state $t_l$ are as follows.

(1) The last signal in the process k received from the process i is the same as the last signal in the process i sent to the process k.

(2) Assume that a state after a transmission transition $-x$ is $t_i'$. The j'th element of the L value at the state $t'_i$ is reachable to the j'th element of the L value at the state $s_k$, or vice versa, where this relation is not applied to the state of the k'th element of the L value.

(3) The state $s_k$ is reachable from the state of k'th element at the L value of the state $t_i$ to the state $s_k$.

Thus, the reception transition $+1$ corresponding to the transmission transition $-1$ in the process 1 is executable at the state 1.0 of the process 2. The reason is as follows. As to the above condition (1), there is no signal requested by the same, and this condition is thus satisfied. As to the condition (2), for the L value (2.0 1.0 1.0) at the state 2.0 of the process 1 and the L value (1.0 1.0 1.0) of the state 1.0 of the process 2, the first element and the third element of each of those L values satisfy the condition (2). As to the condition (3), the second element of each of those L values satisfies this condition. As a result, the state 2.0 and the reception transition $+1.0$ in the process 2 are expanded by the block 5 as shown in FIG. 6(b). The L value at the state 2.0 is then calculated as (2.0 2.0 1.0) by the block 5.

The calculation manner of an L value at a new state resulting from a reception transition in the process k is as follows. Assume that an L value at a destination state of a transmission transition in the process i is $(s_1, —, s_N)$, and an L value at an original state of a reception transition is $(t_1, —, t_N)$. Also, assume that the i'th element of the L value at the destination state of this reception transition is one which goes ahead of the other as compared with $s_i$ and $t_i$. For example, the first element 2.0 of the L value at the state 2.0 of the process 1 goes ahead of the first element 1.0 of the L value at the state 1.0 of the process 2. Therefore, the first element of the L value at the state 2.0 of the process 2 is 2.0.

After finishing expansion according to the transmission transition $-1$ and the corresponding reception transition $+1$, the L value (2.0 2.0 1.0) is recorded on the stable global state set V as V={(1.0 1.0 1.0), (2.0 2.0 1.0)}. Then, the operation of the embodiment of FIG. 3 returns from the block 5 to the block 3.

Next, assume that the transmission transition $-3$ is selected by the block 3. The block 4 is then triggered by the block 3. The state 3.0 and the transmission transition $-3$ in the process 2 are expanded by the block 4 as shown in FIG. 6(b). The L value at this state is calculated by the block 4 as (1.0. 3.0 1.0). At this time, the block 6 is triggered by the block 4. The block 6 tries to remove the reception transition $+1.0$ in the process 2 which is executable at the original state 1.0 of the transmission transition $-3.0$ to the destination state 3.0 of this transmission transition $-3.0$ Copying such a reception transition is called a propagation. However, at this time, the block 7 accesses the memory 1 and knows that the reception transition $+1$ at the state 3 of the process 2 is not defined. Therefore, the block 7 detects that this reception transition is the unspecified executable transition. This reception transition $+1.0$ is shown by a heavy dotted line with the label $+1.0$ in FIG. 6(b). Then, the block 5 is triggered. The block 5 detects that the reception transition $+3$ corresponding to the transmission transition $-3$ is executable at the state 1.0 of the process 1, and expands the state 3.0 and the reception transition $+3.0$ as shown in FIG. 6(a). Then, the block 5 calculates the L value at the state 3.0 of the process 1 as (3.0 3.0 1.0). This L value is recorded on the stable global state set V, which is thus expressed as V={(1.0 1.0 1.0), (2.0 2.0 1.0), (3.0 3.0 1.0)}. At this time, the propagation of the reception transition $+3.0$ resulting from the transmission transition $-1.0$ is possible at the state 2.0 of the process 1. Thus, the block 6 tries to execute this propagation. However, the reception transition $+3.0$ is unexecutable at the state 2.0 of the process 1 as shown in FIG. 1. Thus, this reception transition is detected as the unspecified executable transition.

Further, a deadlock is detected by the block 8 and a specified unexecutable transition is detected by the block 9 in the same way as the prior system mentioned above.

(Omission of redundant expansion according to acyclic expansion manner)

The above-mentioned operations are repeated, and thus, the state transition expansion charts of FIGS. 6(a) through 6(c) and the stable global state set V of FIG. 6(d) are obtained. In those charts, in order to avoid redundant expansion of the state transition sequence, the following process is performed by utilizing the stable global state set V of FIG. 6(d). In FIGS. 6(a) and 6(b), and asterisk * is attached to each of states 3.0 and 3.1. This means that two stable global states (3.0 3.0 1.0) and (3.1 3.1 1.0) are the same as each other. Thus, we can consider that the states 3.0 and 3.1 in the process 1 or 2 are the same as each other. As a result, when a state transition at the state 3.0 coincides with that at the state 3.1, any one of those transitions can be omitted to avoid the redundant expansion. Such a expansion is called an acyclic expansion. For example, in FIG. 6(a), the reception transition +4.0 executable at the state 3.1, which is the same as the reception transition +4.0 executable at the state 3.0 is omitted. This omission is expressed by a narrow dotted line with the label +4.0 as shown in FIG. 6(a), that dotted line being related to the reception transition +4.0 executable at the state 3.0 by an arrow→.

(Detection of bounded overflow)

The description will be now given of a detection manner of a bounded overflow for the protocol of FIG. 1, referring to FIGS. 6 and 7. In the following description, as one example, a bounded overflow on the channel $c_{12}$ through which a signal is transmitted from the process 1 to the process 2 as well as on the channel $c_{21}$ through which a signal is transmitted from the process 2 to the process 1 will be considered. Such a consideration is, of course, application to other channels, such as $c_{13}$, $c_{31}$, etc. $|c_{12}|$ and $|c_{21}|$ show the number of signals on channels $c_{12}$ and $c_{21}$, respectively. $|c_{12}|=0$ and $|c_{21}|=0$ are attached to the state 1.0 of the process 1 and the state 1.0 of the process 2, respectively, as shown in FIGS. 7(a) and 7(b). $|c_{12}|=1$ is attached to the state 2.0 of the process 1 by the block 4 upon expansion of the transmission transition $-3.0$. This is interpreted such that in view of the second element 1.0 of the L value at the state 1.0 of the process 1 and the second element 1.0 of the L value at the state 2.0 of the process 1, the process 2 is receiving the signal 1.0. Thus, $|c_{12}|=1$ means that one signal is remaining on the channel $c_{12}$. $|c_{21}|=0$ is attached to the state 2.0 of the process 2 by the block 5 upon expansion of the reception transition $+1.0$. This is interpreted such that in view of the first element 1.0 of the L value at the state 1.0 of the process 2 and the first element 2.0 of the L value at the state 2.0 of the process 2, the process 2 has already received the signal 1.0 sent from the process 1. Thus, $|c_{12}|=0$ means that there exists no signal on the channel $c_{12}$.

The calculation manner of $|c_{ij}|$ attached to the state $s_i$ of the process i is as follows. Assume that the original state of the state transmission x whose destination state is $s_i$, is $t_i$. Assume that $|c_{ij}|=m$ is calculated for $t_i$. When the transition x is the transmission transition for the process j, $|c_{ij}|=m+1$. When the transition x is the transmission transition for a process exept for the process j, $|c_{ij}|=m$. On the contrary, when the transition x is the reception transition, the following process is effected. First, the j'th element of the L value at the state $t_i$ and the j'th element of the L value at the state $s_i$ are investigated. Now, assume that the j'th elements are expressed as $t_j$, $s_j$, respectively. Under this assumption, $|c_{ij}|$ is calculated, considering that a reception transition from the process i to the process j on the state transition sequence from $t_i$ to $s_j$ has been executed, in other words that a signal on the channel $c_{ij}$ has been received.

For instance, $|c_{12}|$ at the state 3.3 of the process 1 is calculated as 3. This is because $-2.1$ is the transmission transition for the process 2, and thus 1. s added to $|c_{12}|=2$ at the state 2.2 of the process 1.

Further, $|c_{12}|$ at the state 2.3 of the process 1 is calculated in accordance with the following manner. The second element 2.1 of the L value (3.3 2.1 1.0) at the state 3.3 of the process 1 and the second element 2.3 of the L value (2.3 2.3 1.0) at the state 2.3 of the process 1 are taken out. In the transition sequence from the state 2.1 to the state 2.3 of the process 2, the reception transitions $+1.0$ and $+2.0$ are included. Thus, 2 is subtracted from $|c_{21}|=3$ at the state 2.3 of the process 1. That is, $|c_{21}|$ at the state 3.3 of the process 2 is equal to 1.

Therefore, if a capacity of the channels $c_{12}$ and $c_{21}$ is 2, the block 11 will detect that the system is in the bounded overflow state at the state 3.3 of the process 1 and at the state 2.3 of the process 2.

Justification of the above-mentioned process for detecting the bounded overflow state is ensured by the following reasons; expansion is stopped at a state from which a state transition sequence is repeated, and transmission of signal is preferentially executed.

(Stop of acyclic expansion)

Description will be now given of stop manner of acyclic expansion by the block 12.

According to the present invention, expansion of a state transition is stopped by being marked by any one of type 0, 1, 2, or 3. The types 2 and 3 are provided by the present invention. In particular, as mentioned later, when a state is marked by type 3, an unbounded overflow is detected and expansion is stopped at that state.

Marking by type 0

Now, suppose that $L_j(t_i, X)$ shows the j'th element of a L value for a state transmission sequence X from the initial state $o_i$ to the state $t_i$, and $R_j(t_i, X)$ shows a state transition sequence for the sequence X from $o_j$ to $L_j(t_i, X)$.

When the following conditions are satisfied, a state $t_i$ is called a past appearance state of a state $s_i$. In this case, we say that the state $s_i$ is marked by type 0. Also, suppose that X shows a transition sequence from $o_i$ to $t_i$, and Y shows a transition sequence from $o_i$ to $s_i$.

(1) X is a partial sequence of Y.

(2) $L_j(t_i, X)$ coincides with $L_j(s_i, Y)$, for all the processes j (which includes i).

(3) An unprocessed signal sequence $(c_k l^{ji})$ which remains on a channel (k,l) ($1 \leq k$, $1 \leq N$) after transmission and reception of signals on X and $R_j(t_i, X)$ for all the processing j is identical with an unprocessed signal sequence $(c_k l^{si})$ on said channel after transmission and reception of signals on Y and $R_j(S_i, Y)$.

Figure 2A:
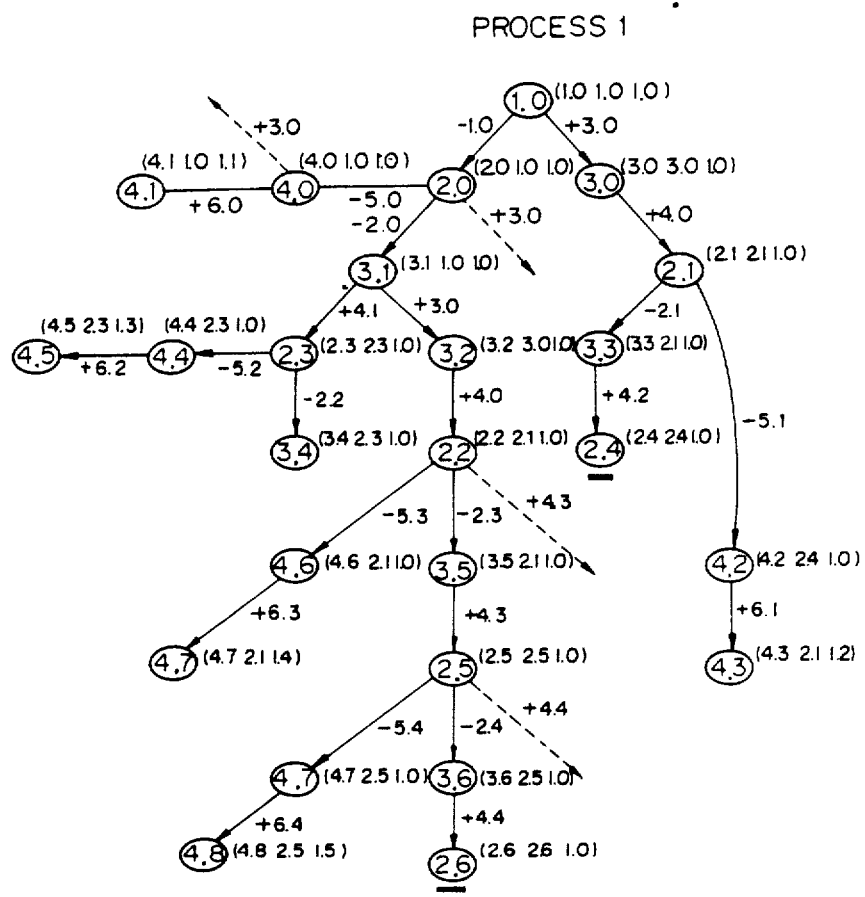

For example, expansion is stopped at the state 2.4 of the process 1 shown in FIG. 2(a), because the state 2.4 is related to the state 2.1 of the process 1 by the above conditions (1) to (3). Similarly, the state 2.6 of the process 1 is related to the state 2.5 of the process 1.

When the conditions (2) and (3) are satisfied, and even the condition (1) is not satisfied, we also say that the state $s_i$ is marked by type 0. Under these conditions, one of X or Y is expanded, and the other is stopped. As apparent from the above explanation, marking by type 0 is also used in the prior art except in case of the condition (1) is not satisfied. However, it should be noted that only marking by type 0 brings about redundant expansion mentioned above.

Marking by type 1 or type 2

Next, when the following conditions (1) to (3) are satisfied, we say that a signal can be sent from the state $t_i$ to the state $s_j$. Assume that X is a transmission sequence from $o_i$ to $t_i$, and Y is a transmission sequence from $o_i$ to $s_j$.

(1) The last signal on X received from the process i coincides with the last signal on Y sent to the process j.

(2) For all the processes k except for j, $L_k(t_i, Y)$ and $L_k(s_j, X)$ are on a common transition sequence.

(3) $s_j$ is reachable from $L_j(t_i, Y)$. When all $s_j$ which can be sent by $t_i$ have been marked by the type 0, we say that $t_i$ is marked by type 1. Marking by type 1 is also used in the prior art.

In the protocol expanded according to the acyclic form, when (1) a system state which coincides with the stable global state $G=(S,C)$, $S=(s_1, —, s_i, —, s_j, —, s_N)$ has already existed, (2) $t_i$ is reachable from $t_i$ to $s_i$, and (3) $L_j(t_i, X)$ is reachable from $s_j$ for all j, or (4) there doesn't exist specified paths except a path from $L_j(t_i, X)$ to $s_j$, we say that $t_i$ is marked by type 2.

Under those conditins (1) to (4), when a state transition towards $s_j$ is the reception transition, $s_i$ is immediately marked by type 2. For example, the expansion at the state 2.3 of the process 1 in FIG. 6(a) is stopped, because the relation between the state 2.3 and the state 2.2 in the process 1 satisfies the above conditions (1) through (4).

(Detection of unbounded overflow)

In order to detect the unbounded overflow, the following definition is added to the definitions in the stop manner of the acyclic expansion mentioned before.

When there exist states $s_i$, $t_i$ which satisfy the following conditions (1) through (3), we say that the state $u_i$ is marked by type 3, and expansion upon the state $u_i$ is then stopped. In the following coonditions, suppose that X, Y and Z are transition sequences from the state $o_1$ to states $s_i$, $t_i$ and $u_i$, respectively.

(1) X is a partial sequence of Y.

(2) For all the processes j, $L_j(s_i, X)$, $L_j(t_i, Y)$ and $L_j(u_i, X)$ coincide with one another.

(3) For all the processes j, an unprocessed signal sequence $c_{k,l}^{\mu i}$ which remains on a channel (k,l) ($1 \leq k$, $1 \leq N$) after transmission or reception of signals on $R_j(u_i, Z)$ is related by the following conditions to unprocessed signal sequences $c_{k,l}^{ti}$ and $c_{k,l}^{si}$ after transmission and reception of signals on $R_j(t_i, Y)$ and $R_j(s_j, X)$, respectively.

$$c_{kl}^{ti} = (d)^p \quad p \geq 0$$

$$c_{kl}^{ti} = (d)^q \quad q \geq 0, q \geq p$$

$$c_{kl}^{\mu i} = (d)^{2q-p}$$

where for at least a pair of k,l, $q > p$; $(d)^p$ shows d-d—d(-the number of d is equal to p).

It will intuitionally be understood from the above definition that $|c_{k,l}|$ of the channel $c_{k,l}$ increases monotonously. Therefore, such a state is detected as an unbounded overflow and expansion is thus stopped.

Further, in the detection manner of the unbounded overflow described before, when no message sequence which should be deleted exists, if there exist the signal sequence d and the non-negative integer q which satisfy $c_{k,l}^{ti} = c_{k,l}^{si} \cdot (d)^q$ and $c_{k,l}^{\mu i} = c_{k,l}^{si} \cdot (d)^{2q}$ in spite of the content of the unprocessed signal sequence $c_{k,l}^{si}$, the unbounded overflow is detected, where for at least a channel (k, l), q=0. For the protocol of FIG. 1, it will be appararent from FIGS. 6(a) through 6(c) that no unbounded overflow is detected.

As a result, according to the present embodiment, errors shown in FIGS. 5(b) through 5(f) are detected for the protocol of FIG. 1. It should be noted that those errors are a part of all the errors on the protocol, that is, for simplicity of drawings, part errors are shown.

When all states of each process at which an executable transmission pair or an executable reception pair can be executed are marked, the acyclic expansion of the protocol is stopped.

Figure 8:
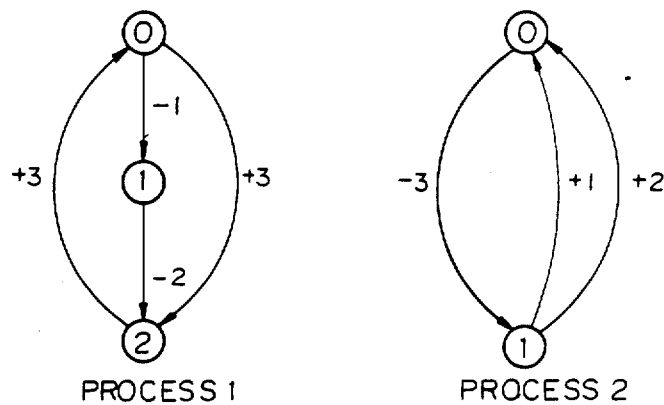
FIG. 8 is another example of a protocol to be tested.
Figure 9A:
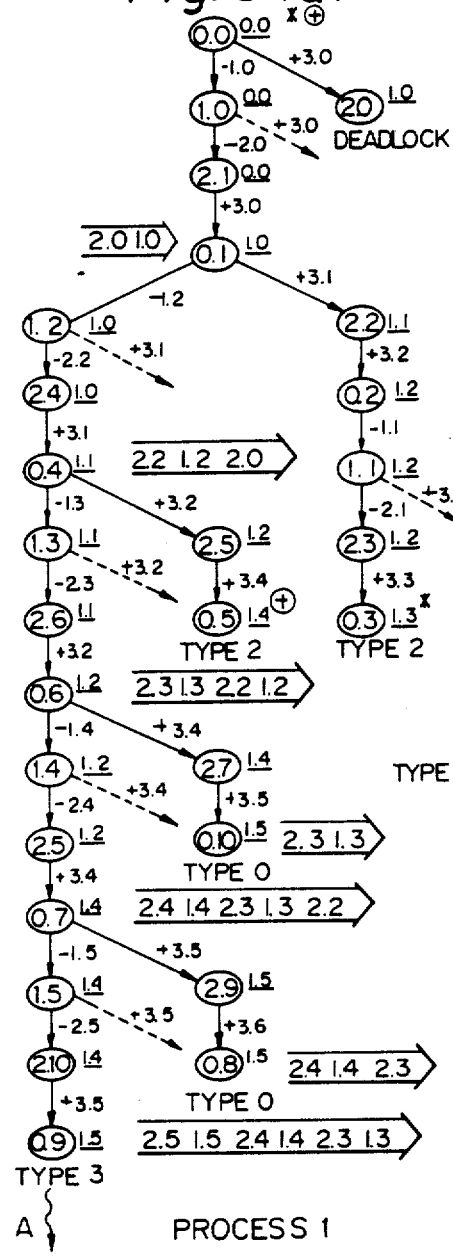
FIGS. 9(a) and 9(b) show the other state transition expansion charts obtained by the present invention.
Figure 9B:
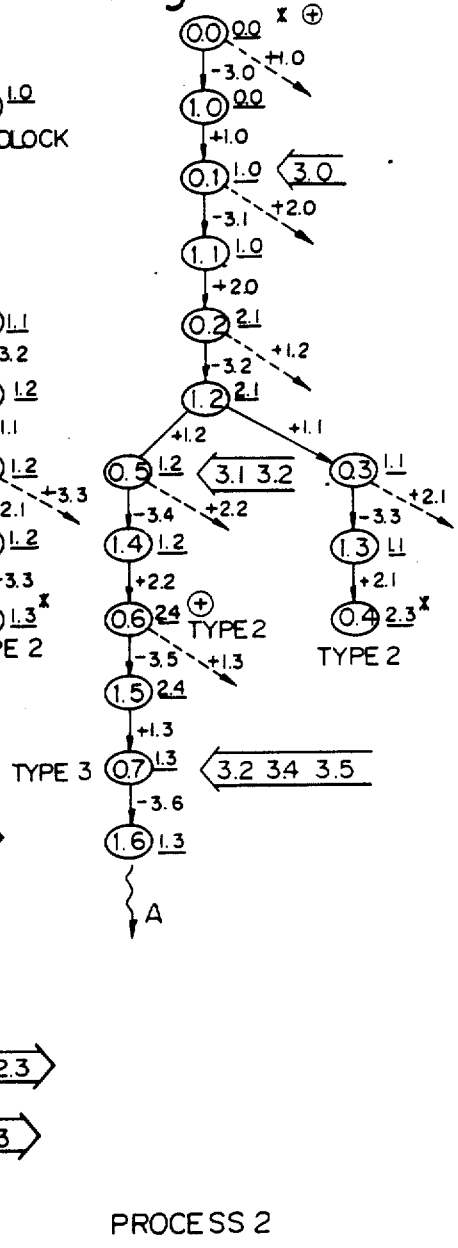

For the further explanation of the stop manner of acyclic expansion by the block 12, another example of the protocol is shown in FIG. 8, and the expansion charts of this protocol are shown in FIGS. 9(a) and 9(b). In those figures the L value of the state 0.10 of the process 1 is (0.10 1.5) and signals which are remaining on the channel $c_{12}$ at the state 0.10 are 1.3 and 2.3. In other words, all the signals 1.0, 2.0, 1.2 and 2.2 sent from the process 1 to the process 2 have been received by the process 2, and thus is not remaining on the channel $c_{12}$. Also, the L value of the state 0.1 of the process 1 is (0.1 1.0) and signals which are remaining on the channel $c_{12}$ at the state 0.1 are 1.0 and 2.0. Therefore, it will be understood that signals on the channel $c_{12}$ at the state 0.10 are identical with signals on the channel $c_{12}$ at the state 0.1.

This means that the state transitions $-1.2$ $-2.2$, $+3.1$, $-1.3$, $-2.3$, $+3.2$, $+3.4$ and $+3.5$ between the states 0.1 and 0.10 are repeated in sequence from the state 0.10. Of course, in this case, the numerals after "." differ from the numerals in the above transitions. As a result, the state 0.10 is marked by type 0 and expansion is thus stopped at the state 0.10. Similarly, the state 0.8 is marked by the type 0. The system state composed of the state 0.0 of the process 1 and the state 0.0 of the process 2 is the stable state, because no signal is on the channels between the processes 1 and 2. The system state composed of the state 0.5 of the process 1 and the state 0.6 of the process 2 as well as the system state composed of the state 0.3 of the process 1 and the state 0.4 of the process 2 are also the stable states. Each element of those stable states is identical with one another, and thus expansion from each state is repeated. Therefore, each of the states 0.3, 0.4 0.5 and 0.6 is marked by type 2 and expansion therefrom is stopped.

The L value at the state 1.0 of the process 1 is (0.1 1.0), at which the unprocessed signal sequence on the channel $c_{12}$ is 1.0-2.0. Also, the L value at the state 0.6 of the process 1 is (0.6 1.2), at which the unprocessed signal sequence on the channel $c_{12}$ is 1.2-2.2-1.3-2.3. Further, the L value of the state 0.9 of the process 1 is (0.9 1.5), at which the unprocessed signal sequence on the channel $c_{12}$ is 1.3-2.3-1.4-2.4-1.5-2.5.

Therefore, the state 0.9 of the process 1 is marked by type 3. From the state 0.9, the state transition sequence $-1$, $-2$, $+3$, $-1$, $-2$, $+3$ is repeated and signals 1 and 2 are thus directed to be stored on the channel $c_{12}$. As a result, the expansion from the state 0.9 is stopped as the unbounded overflow. Likewise, the state 0.7 is marked by type 3.

As mentioned above, acyclic expansion for the protocol of FIG. 8 is stopped.

Of course, the present detection manner is applicable to a protcol validation system which makes a global state.

(Application of the detection of the unbounded overflow)

The description will be now given of application of the unbounded overflow detection to a protocol with a time-out function, such as Alternating Bit Protocol (abbreviated to ABS in the following explanation).

Figure 10A:
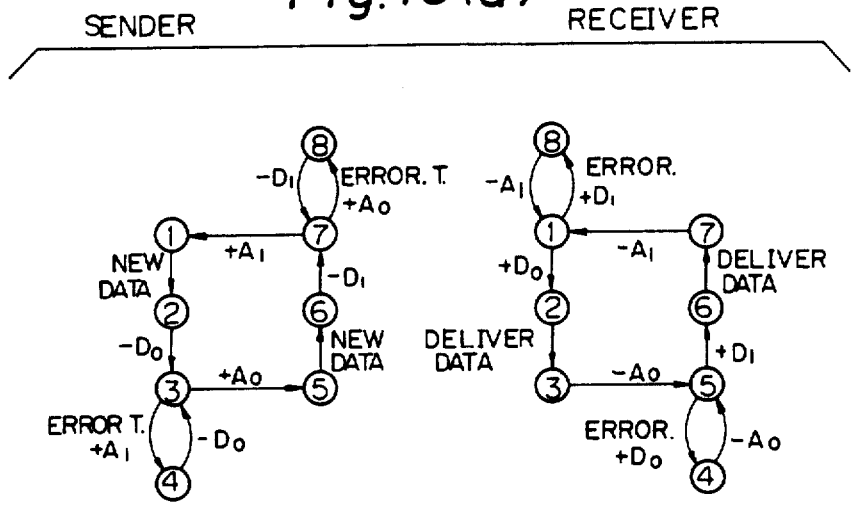
FIGS. 10(a) and 10(b) are state transition expansion charts of ABP.
Figure 10B:
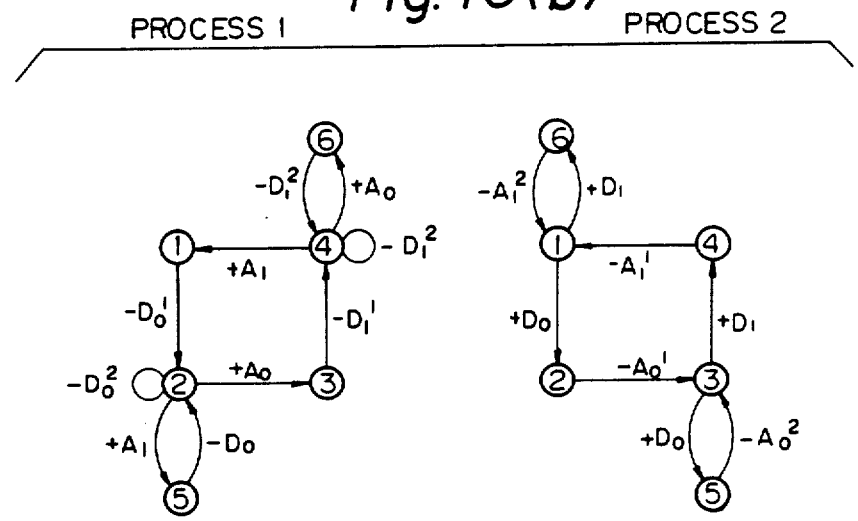

This protocol has been used in ARPA (Advanced Research Project Aqency) network in U.S. or EIN (European Informatics Network) in Europe. FIG. 10(a) shows the transition chart of ABP. In this figure, "ERROR" shows an error in transmission/reception of a message, and T shows a time-out. For simple explanation, suppose that there is no error. FIG. 10(b) showws a simplified drawing of FIG. 10(a), in which a new data and a deliver data shown in FIG. 10(a) are omitted. A transition which returns to the original state, or a self-loop shows a time-out transition. To provide distinction between the same transmission messages, a suffix is used. For instance, $-D_o$ is distinguished such as $-D_o^1$, $-D_o^2$, $-D_o^3$. $-D_o^2$ shows the time-out transition. $+D_o$ shows three message of $+D_o^1$, $+D_o^2$, $+D_o^3$. The state 1 is the initial state.

The description will be now given of application of the present invention mentioned above to the protocol of FIG. 10(b). In this case, a following extended expansion manner according to the present invention is used in order to decrease states and the total number of state transitions provided by the acyclic expansion.

Assume that a set of a state transition sequence which returns from the initial state in the process i to the initial state again is expressed by $R_i$, and that a set having j times ($j \geq 0$) of an infinitely repeated signal sequence is expressed by $R_i^j$. $R_i$ is then represented such as $R_i = R_i^0 \cup R_i^1 \cup - \cup R_i^j \cup -$. If a channel state at the returned initial state is a protocol which satisfies the recursive property with regard to j of $R_i^j$, all $R_i$ are not expanded, but only $R_i^0$, $R_i^1$ are expanded. The process mentioned above is effected for each process.

Figure 11:
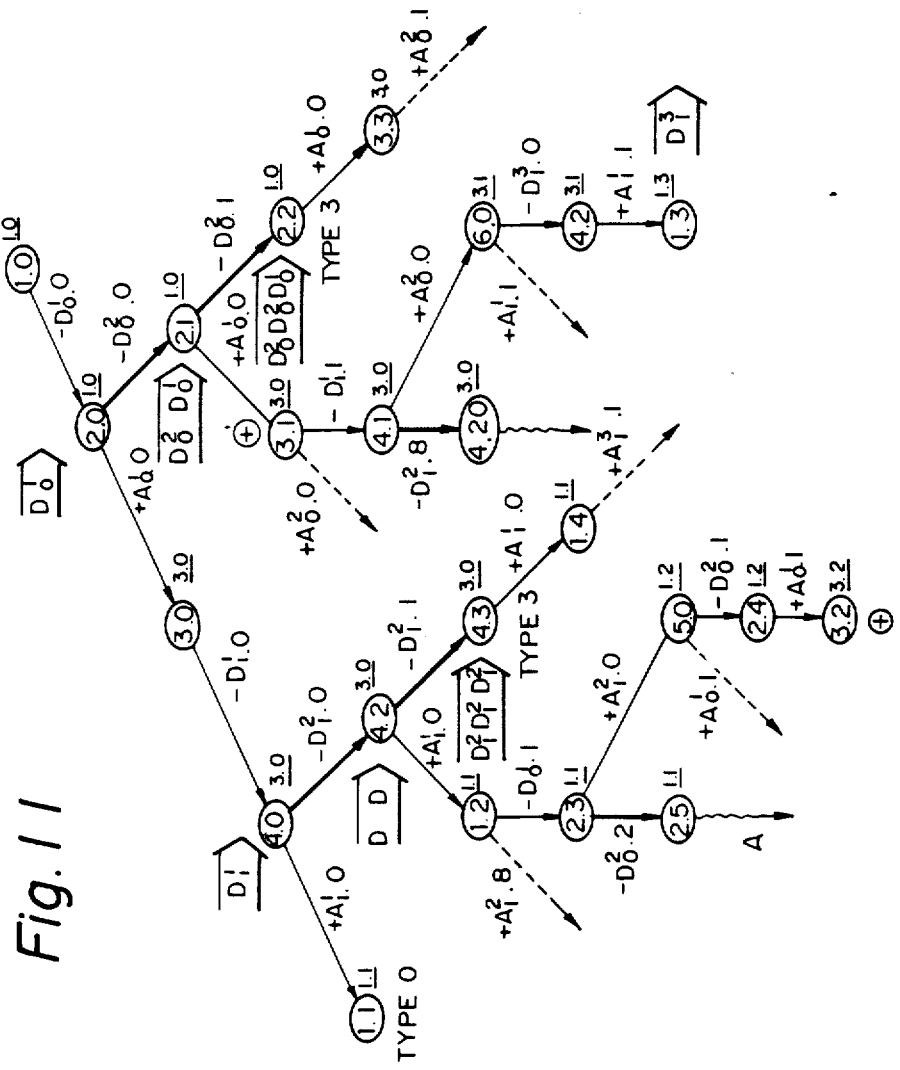
FIGS. 11 and 12 show the result of application of the present invention to the protocol of FIG. 10(b)
Figure 12:
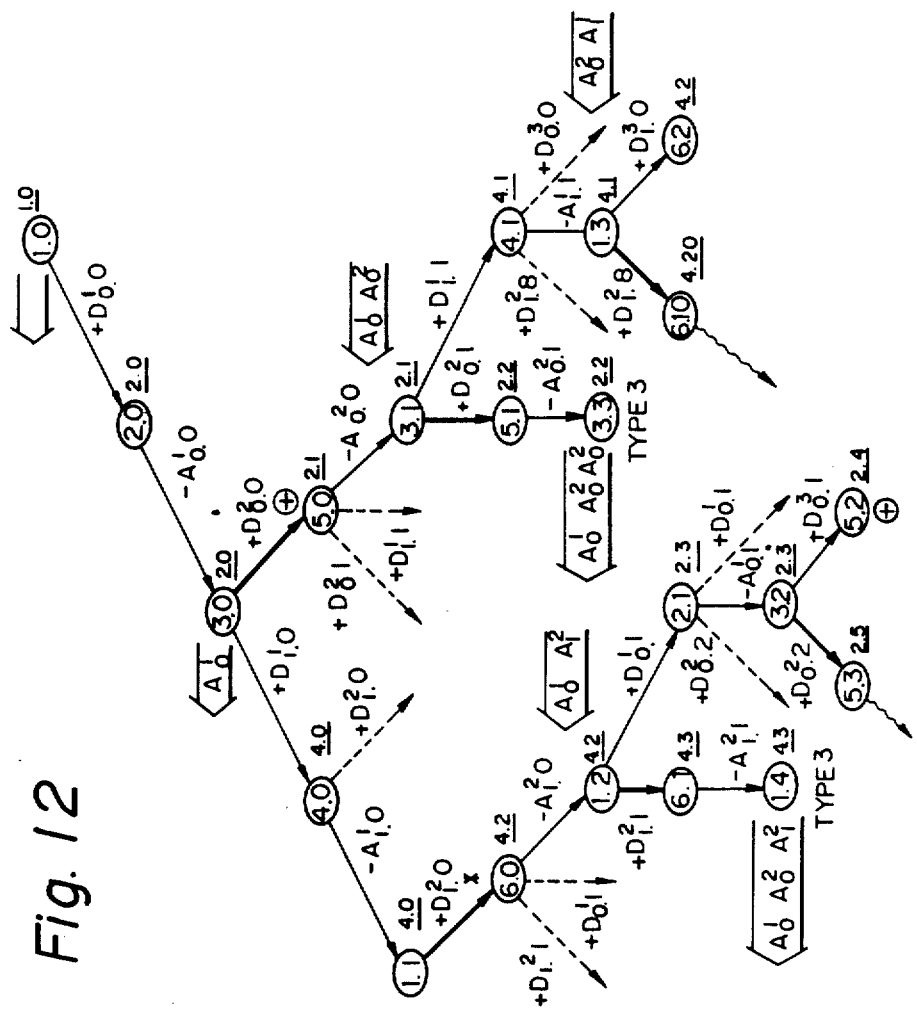

FIGS. 11 and 12 show the results obtained by applicating the above extended expansion manner to the protocol of FIG. 10(b), in which expansions indicated by A are omitted, and the arrows →, ⇒ show the first time-out signal transition and the second time-out signal transition, respectively. Each of these time-out transitions corresponds to the infinitely repeated signal sequence mentioned above. For example, $(-D_o^1.0) \cdot (+A_0^1.0) \cdot (-D_1^1.0) \cdot (+A_1^1.0)$ belongs to $R_1^0$ and $(-D_0^1.0)$. $(D_0^2.0) \cdot (+A_0^1.0) \cdot (-D_1^1.1) \cdot (+A_0^2.0) \cdot (-D_1^3.0) \cdot (+A_1^1.1)$ belongs to $R_1^1$. The one is put to $r_1$ and the later is put to $r_2$. In ABP, the following recursive property is obtained for the state transition sequence which belongs to $R_1$.

When i numbers of time-out transistors $(-D_0^2)$ are included on $r \in R_1$, the channel state $C=(c_{12}, c_{21})$ at the initial state which appears again is as follows;

$c_{12}=(D_1)^i$ for channel (1,2)
$c_{21}=\epsilon$(empty sequence) for channel (2,1).

For example, $c_{12}=\epsilon$ and $c_{21}=\epsilon$ because no time-out transition is included for $r_1$. Also, $c_{12}=D_1^3$ and $c_{21}=\epsilon$ because one time-out transition is included for $r_2$.

The detection manner of the unbounded overflow is used as the stop manner of the expansion in this case, since the expansion after $R_1$ is a repetition of $R_1$.

As mentioned above, the extension of the expansion manner of the state transition for each process makes it possible to validate ABP. In general, that extended expansion manner is useful for a protocol having a time-out transition such as ABP.

(Detailed configuration of each block in FIG. 3)

FIG. 13 shows a detail of the memory 1 shown in FIG. 3. In this figure, the numeral 101 is an asociative memory for storing state transitions for each process in the protocol specification in the format of FIG. 4(a). The numerals 102, 103 and 104 are memories for storing an initial state and an L value in the process 1, 2 and 3, respecrively, in the format of FIG. 4(b). An associative memory stores information in a plurality of groups, and when an input relating to a cell information in one group is provided, the whole information relating to said cell information is delived, and alternatively when there exists no group including said all information, a signal indicating such a situation is delived. The associative memory 101 stored information in each line of FIG. 4 as a group, and for instance when an input (process=1, and state=4) is applied, then an output (label=+6, state after the state transition=4, and destination process of transmission/reception=3) is provided. When an input (process=2, and state=1) is applied, an output (label=+1, state after the state transition=2, destination process of transmision/reception=1) as well as an output (label=−3, state after state transition=3, and destination process of transmission/reception=3) are provided. Occasionally, as will be described later, an input/output of partial information which differs from the above examples in the kind is required, like an input is (process=1, state=1, label=−1, and destination process of transmission/reception=2), and an output is (state after transition=2). Therefore, an associative memory for each partial input information must be prepared. However, for the sake of the simplicity of the following explanation, it is assumed that a single associative memory 101 is prepared, and that single memory provides all the necessary information.

Figure 14A:
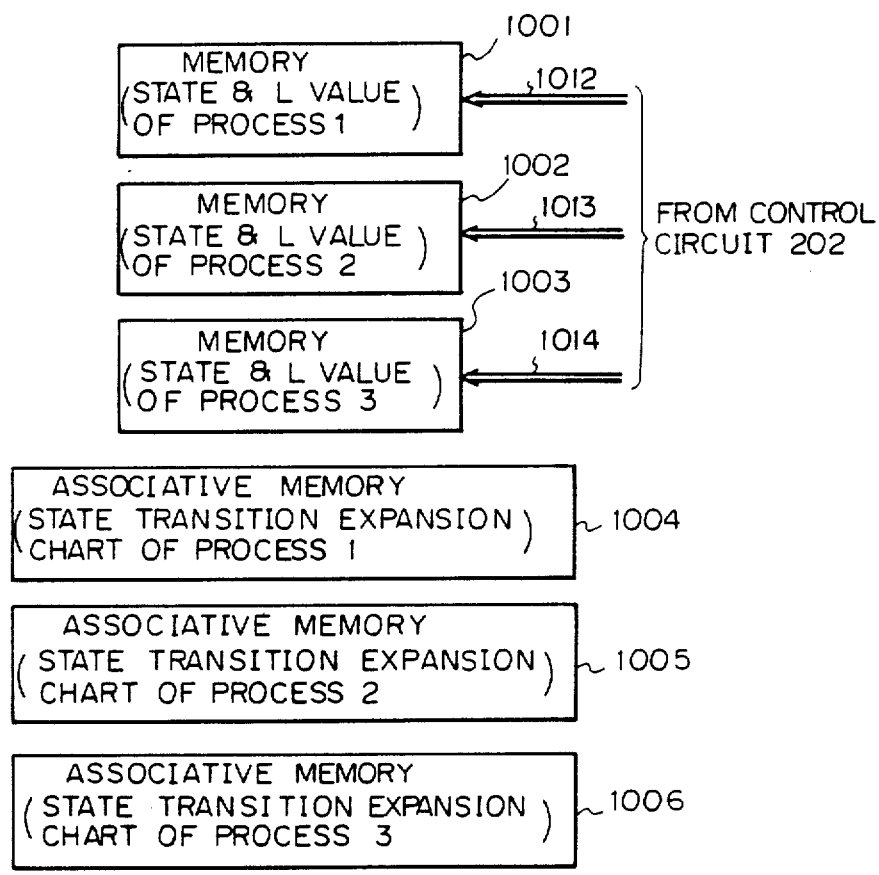

FIGS. 14(a) and 14(b) show a detail of the memory 12, in which the numerals 1001, 1002 and 1003 are memories provided for the processes 1, 2 and 3, respectively. Each memory stores a state and a L value of the corresponding process which are to be processed in that next step. The numerals 1004, 1005 and 1006 are associative memories for storing information of the state transition expansion charts in the processes 1, 2 and 3, respectively, as shown in FIG. 5(a). It is assumed that those associative memories can be handled like the memory 101. The numerals 1007, 1008, 1009, 1010 and 1011 in FIG. 14(b) are memories for storing an unspecified executable transition, a deadlock state, a specified executable transition, a bounded overflow and an unbounded overflow a shown in FIGS. 5(b) through 5(f), respectively. The numerals 1012, 1013 and 1014 are provided for the process 1, 2 and 3, respectively. Each of those memories for storing a set of a state and its L value of the corresponding which have not been unprocessed yet. The numeral 1015 is an associative memory for storing a stable state in the format of FIG. 5(c).

FIG. 15 shows a detail of the initial set block 2. The numeral 201 is an input terminal for receiving an electrical signal of a start instruction of the protocol validation according to the present invention. The numeral 202 is a control circuit for providing control signals to memories 102, 103 and 104, memories 1001, 1002 and 1003, memories 1012, 1013 and 1014, and the block 3 for extracting the executable transmission transition from the memory 101, upon application of the signal to the terminal 201. When the control circuit 202 provides the control signal to memories 102, 103 and 104, then each of the memories 102, 103 and 104 provide the initial state information of the corresponding process. That information is then stored in memories 1001, 1002 and 1003 each of which serves to store a state and its L value of the corresponding process to be processed in the next step. Also, when the control circuit 202 provides the control signal to memories 1012, 1013 and 1014, then the state set in each of those memories is initiated to 0 (empty set). Further, upon application of the control signal from the control circuit 202 to the block 3, the block 3 is triggered.

FIG. 16 shows a detailed configuration of block 3. The block 3 starts to operate upon receiving the control signal from the control circuit 202 in the block 2.

First, a selection circuit 301 is triggered by the block 2 and then accesses the memories 1001, 1002 and 1003 each of which stores the state information of the corresponding process to be processed in the next step. When a state information is stored in any one of those memories in fact, that information is transferred to a register 302 and then stored therein together with its process name. In this case, the output of a flip-flop 306 is made to be in ON state. The information in the register 302 includes the process name, the state name, the number of times this state occurs and its L value. The process name and the state name is sent to the memory 101. Therefore, all the specified transmissions/receptions designated by that process name and that state name are extracted from the memory 101, and then applied to a selection gate 303. The selection gate 303 passes only specified transmissions therefrom, which are then stored in a memory 304. In this case, the number of immediately executable transmission transitions stored in the memory 304 is countered by a counter 305. Then, when the flip-flop 306 is in ON state, and the count value of the counter 305 is 0, which means that there exists no immediately executably transmission transition in all the processes, the acyclic expansion is finished and the block 9 for detecting the specified unexecutable transition is then triggered. On the contrary, when the count value of the counter 305 is not 0, the control signal is then sent to the block 4, and the operation of the block 4 starts.

FIG. 17 shows a detailed block diagram of the block 4 for expanding the transmission transition. In this figure, the numeral 401 is a register for storing the state information to be processed and stored in any one of memories 1001, 1002 or 1003. The numeral 402 is a register for storing, in sequence, the information with regard to the executable transmission transitions stored in the memory 304. This information in the register 402 is transferred to a register 403 in the parallel form, and then stored in a part of the storage area thereof. At the same time, the information stored in the register 401 except for the process name is stored in another part of the storage area of the register 403. Information thus stored in the register 403 is transferred to a branch circuit 405, and is then transferred in the parallel form through the branch circuit 405 to any one of the associative memories 1004, 1005 or 1006 according to the process name stored in the register 401. In order to make the acyclic expansion chart in the memory form, not only the information with respect to the state (i.e. the state name, the number of times this state occurs and its L value) but also the information with respect to the signal (the signal name, the state after the transition and the destination process of the signal) are stored in the register 403. At the same time, the state after the transition stored in the memory 403 is transferred to the memory 101, from which the number of times that state occurs is transferred to an increment circuit 404. This circuit 404 increases the received number of times by 1 and transfers it to a part of the storage area in a register 407, which stores the destination state of the transmission transition.

The L value in the register 401 is transferred to an L value calculation circuit 406 for calculating an L value of a state after a transmission transition.

FIG. 18 shows a detailed configuration of the L value calculation circuit 406. The L value is transferred from the register 401 to the circuit 406 in the parallel form, and then stored in its internal register 409. The state name and the number of times this state occurs, both of which are composed of the L value are transferred from the register 407 to selection circuits 410, 412 and selection circuits 411, 413 and 415, respectively. In each of those selection circuits, according to the process name (*8) having a transmission transition to be expanded, a state (*3) after this transition is selectively passed through the corresponding one of selection circuits (410, 412, 414) and the incremented number of times (*4) that state occurs is selectively passed through the corresponding one of selection circuits (411, 413, 415). For each of the other processes, the state and the L value stored in the register 409 are selectively passed. The L values (*5)(*6)(*7) each of which is formed by the state name and the number of times of its occurrance in each process selected by the selection circuits 410 through 415 is transferred to the register 407 in the parallel form. At the same time, the process name (*8) is transferred from the register 401 to the register 407, and the state name (*3) is transferred from the register 402 to the register 407. As a result, the information with respect to the newly provided state resulting from the transmission transition is stored in the register 407 in FIG. 17(b). That information in the register 407 is then transferred through a branch circuit 408 to any one of the memory 1012, 1013 or 1014 in the parallel form and stored therein.

When the information ($I_1$) composed of the state $S_1$, the number $r_1$ of times of appearnace of this state $s_1$, (the reception) signal name $+t_1$, the state $s_2$ after the transition, the destination process $p_1$ and the L value $l_1$ is transferred from the branch circuit 405 to any one of the associative memory 1004, 1005 or 1006, if there exists the reception transition sequence of $(s_1)$, $(+t_1)$, $(s_2)$, $(+t_2)$, $(s_3)$, $(+t_3)$, $(s_4)$, —, $(s_n)$, $(+t_n)$, $(s_{n+1})$ $(n>1)$ as shown in FIG. 19, information sequence $I_1, I_2, I_3$ —, $I_n$ including such as the above reception transition sequence is transferred in sequence through an OR circuit 416 to a memory 417 shown in FIG. 17(b), and is stored therein. Further, the number of that information sequence $I_1, I_2, I_3$ —, $I_n$ is recorded on a counter 418. When the number recorded on the counter 418 is not 0, the block 6 for propagating a reception transition sequence because of the transmission transition is triggered. Finally, the block 5 is triggered.

Figures 2, 20A:
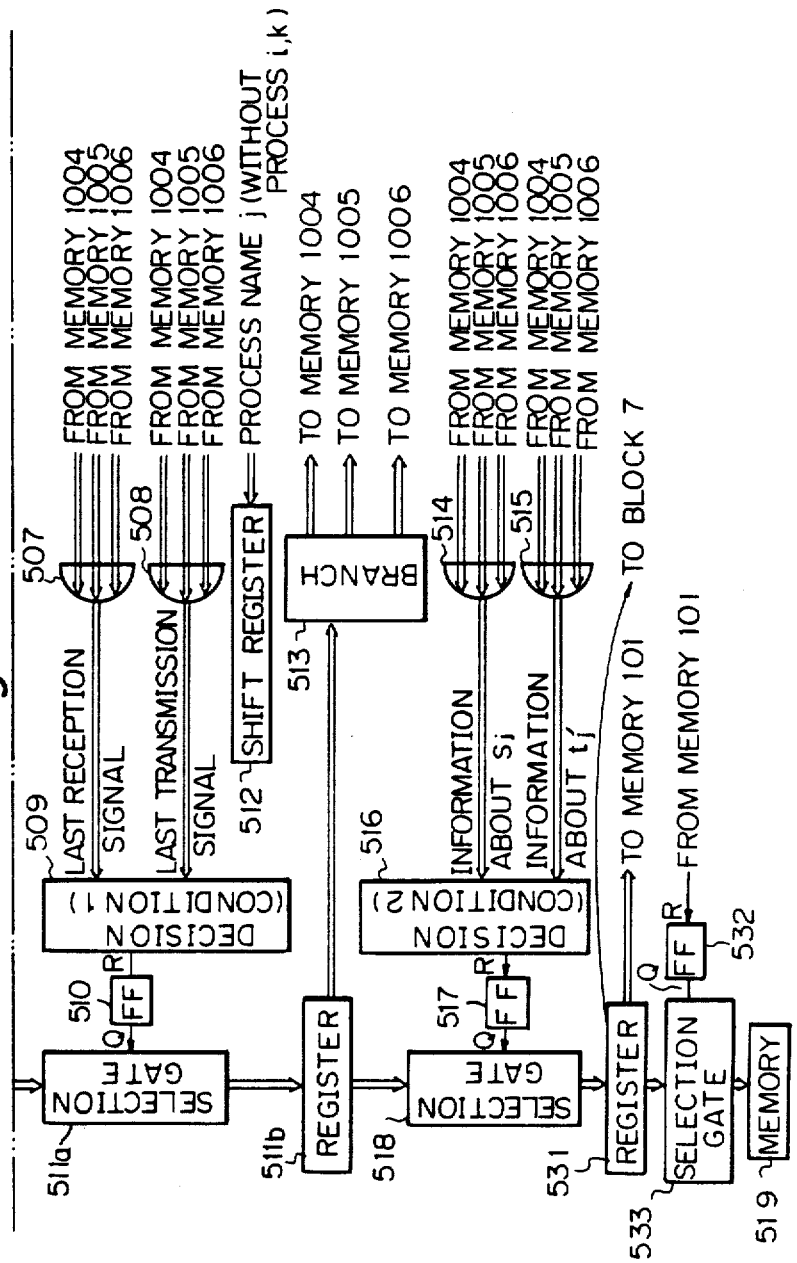
Figures 2, 20B:
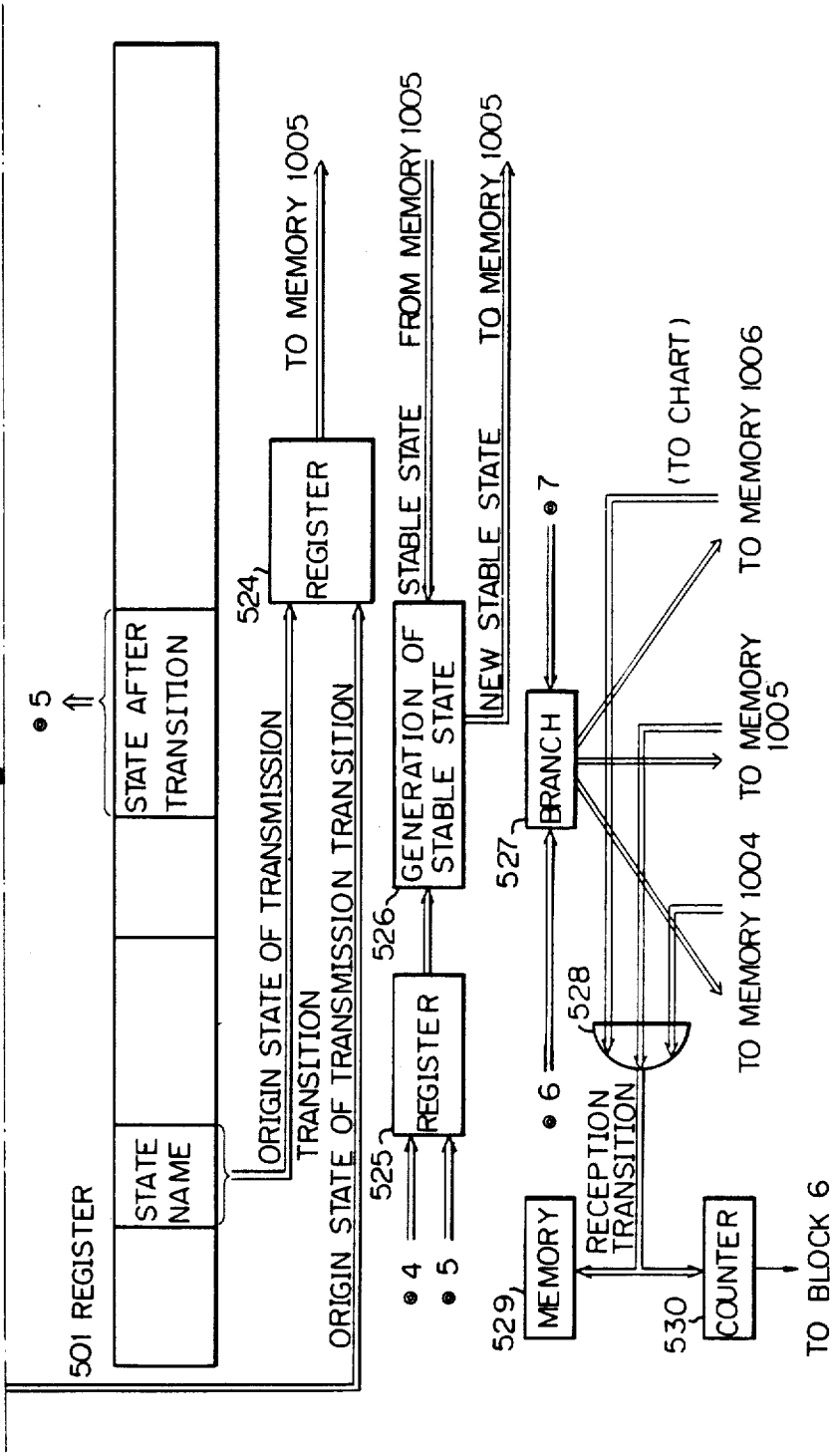

FIG. 20(a) shows a part of a detailed configuration of the block 5 and FIG. 20(b) shows another part. For the sake of easily understanding this block diagram, the description will be first given, referring to FIG. 22, of a extraction manner of information on associative memories 1004, 1005 and 1006 according to the necessary and sufficient condition mentioned above. According to the condition (3), after the k'th element $t_k$ of the L value of the state $t_i$ of the process i is found, the state $s_k$ which is reachable at the state $t_k$ of the process k by an pointer (denoted by an arrow) is a first candidate state capable of receiving the signal x. According to the condition (1), it is checked whether a transmission signal which is first found by being followed by the pointer from the state $t_i$ of the process i along the inverse direction, and a reception signal which is first found by being followed by the pointer from the state $s_k$ in the process k along the inverse direction are the same as each other or not. According to the condition (2), the j'th element $t_j'$ of the L value of the state $t_i'$ after the transition $t_i$ in the process i is found in the process j, and the j'th element $s_j$ of the L value of the state $s_k$ of the process j is found. At this time, it is checked whether $t_j$ and $s_j$ of the process j are reachable from one to the other by the pointer or not. When the transmission signal and the reception signal coincide with each other in the above first check, and when $t_i$ and $s_j$ are reachable in the second check, the state $s_k$ capable of receiving the transmission signal x in the process i is obtained.

In FIG. 20(a), 501 is a register like registers 301, 401, for storing the information with respect to the state to be processed which is stored in any one of the memories 1001, 1002 and 1003. The information in the register 501 is transferred to a branch circuit 502 in the parallel form, and is then branched thereby to any one of the memory 1004, 1005 or 1006 according to the process name. The information with respect to the state satisfying the conditions (3) is transferred from any one of the memory through an OR circuit 503 to a memory 504. Also, the last transmission signal is transferred to an OR circuit 508 and the information with regard to $t_j'$ is transferred to an OR circuit 515. The information is read out in the memory 504 in sequence and then stored in a register 505. The information in the register 505 is transferred to a branch circuit 506 in the parallel form and is then branched thereby to any one of the memory 1004, 1005 or 1006. The last reception signal is transferred from any one of those memory through an OR circuit 507 to a detection circuit 509. This detection circuit 509 detects whether the condition (1) is satisfied or not, in other words the last reception signal coincides with the last transmission signal or not. When the condition (1) is satisfied, a flip-flop 510 is made to be in ON state. When the flip-flop 510 is in ON state, a selection gate $511_a$ passes through the information from the register 505. Then, this information is stored in a register $511_b$. In a shift register 512, the process name j without i, k is stored. The information in the register $511_b$ is transferred to a branch circuit 513 in sequence according to the process name j stored in the shift register 512. The information thus transferred is then transferred to any one of the memory 1004, 1005 or 1006 by the branch circuit 513. The information with respect to the state $s_j$ is transferred from any one of those memories through an OR circuit 514 to a detection circuit 516. This detection circuit 516 detects whether the condition (2) is satisfied or not, in other words, $s_j$ is reachable to $t_j'$ or vice versa or not. When the condition (2) is satisfied, a flip-flop 517 is made to be in ON state. In this state of the flip-flop 517, the information in the register $511_b$ is transferred through a selection gate 518 to a register 531 and stored therein. This information in the register 531 is transferred to the memory 101. If the reception transition of the content of the register 531 is specified on the protocol specification stored in the memory 101, then the output of a flip-flop 532 is made to be in ON. When the output of the flip-flop 532 is in ON state, the information in the register 531 is transferred through a selection gate 533 to a memory 519. Also, in this ON state of the flip-flop 532, the block 7 for detecting the unspecified executable transition is triggered and the operation of the block 5 is then stopped.

The information stored in the register 519 is transferred in sequence to a register 520 shown in FIG. 20(b). The L value which is a part of that information in the register 520 is transferred to a L value calculation circuit 521. The state after the transition is transferred to the memory 101. Then, the number of times of occurrance of said state after the transition is transferred to an increment circuit 521, which increases the number of times by 1, and the increased number of times is transferred to a part of the storage area in a register 522. The state after the transition is directly transferred to a part area in the register 522 which stores the destination state of the reception transition. The L value calculation circuit 521 receives the output from the L value calculation circuit 406 which calculates the L value at the destination state of the transmission transition as well as the L value at the original state of the reception transition in the register 520, calculates the L value at the destination state at the reception transition, and then transfers this calculated L value to parts ( ⓞ1, ⓞ2, ⓞ3) of the storage area in the register 522. All the information in the register 522 is transferred to a branch circuit 523 together with the process name stored in the register 520. Those information is transferred through the branch circuit 523 to any one of the memory 1012, 1013 or 1014 which stores the unprocessed state, and then stored therein.

The original state of the transmission transition in the register 501 and the original state of the reception transition in the register 520 are transferred to a register 524 shown in FIG. 20(b). That information is transferred to the memory 1015. When there exists a stable state including said original state of the transmission transition and said original state of the reception transition, that stable state is transferred to a stable state generation circuit 526. The state after the transmission transition and the state after the reception transition are transferred to a register 525 and stored therein. Those states are then transferred to the stable state generation circuit 526, which transfers the stable state including the state after the transmission transition and the state after the reception transmission to the memory 1015, in which that stable state is stored.

The information in the register 520 is transferred to a branch circuit 527, is branched thereby to any one of the memory 1004, 1005 or 1006 for storing the state transition expansion chart in accordance with the process name ( 7), and stored therein. When on the chart there exists a transmission transition at the original state of the reception transition, the reception transition to be expanded is transferred through an OR circuit 528 to a memory 529 and stored therein. At the same time, the number of such a transmission transition is transferred to a counter 530. When the number is not 0, the block 6 for propagating the reception transition sequence because of the transmission transition is triggered.

FIG. 21 shows a detailed block diagram of the L value calculation circuit 521 in the block 5. The output from the L value calculation circuit 406 which calculates the L value ($t_1$ $t_2$ $t_3$) at the destination state of the transmission transition is transferred to a register 531 and stored therein. The L value ($s_1\ s_2\ s_3$) at the original state of the reception transition is transferred to a register 532 and stored therein. The first element $t_1$ in the register 531 and the first element $s_1$ in the register 532 are transferred to a register 533 and then stored therein. The information in the register 533 is transferred to the memory 1004. When $t_1$ is reachable from $s_1$, this $s_1$ is trasferred to a register 536 and then stored therein. Alternatively, when $s_j$ is reachable from $t_1$, $t_1$ is transferred to the register 536 and then stored therein. Likewise, the second element and the third element are also processed. The information in the register 536 is transferred to the register 522 shown in FIG. 20(b).

Figure 23B:
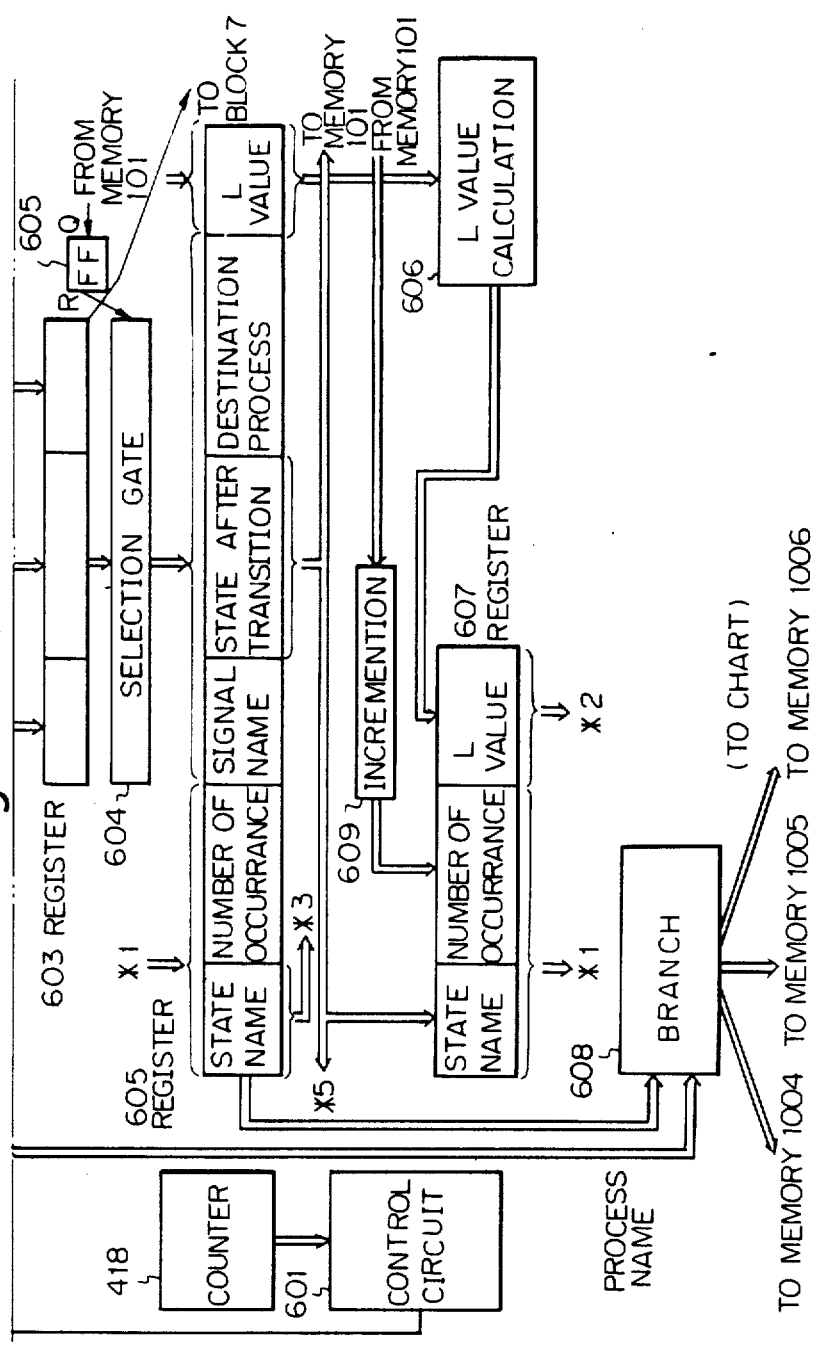

FIG. 23 shows a detailed configuration of the block 6 for propagating the reception transition sequence resulting from the transmission transition. In this figure, a memory 417 stores the reception transition sequence $I_1$, $I_2$, —, $I_n$. A counter 418 stores the number n of the reception transition sequence. A control circuit 601 transfers, in sequence, the reception transition sequence $I_1$, $I_2$, —, $I_n$ to a register 602 by times equal to the number stored in the counter 418. The information with respect to the destination state of the transmission transition stored in a register 407 is transferred to a part of the storage area in a register 605; The state name in the register 605, and the signal name and the destination process name in the register 602 are transferred to the memory 101. When the state after the reception transition is provided on the protocol specification, that state is transferred from the memory 101 to the register 603. At the same time, a flip-flop 605 is made to be in ON. The signal name and the destination process in the register 602 are transferred to the register 603. The information stored in the register 603 is, when the flip-flop 605 is in ON state, transferred through a selection gate 604 to a part of the storage area in the register 605 and then stored therein. Alternatively, when the flip-flop 605 is still in OFF state, the block 7 for detecting the unspecified executable transition is triggered, and the operation of the block 7 is stopped.

The state after the transition in the register 605 is transferred to the memory 101 and a register 607. The number of times of occurrance of the state after the transition is transferred to an increment circuit 609. This circuit 609 increases this number of times by 1. The increased number of times is transferred to the register 607. The L value stored in the register 605 is transferred to an L value calculation circuit 606. This circuit 606 makes the corresponding process name and the number of times coincide with the content of the register 607 and then transfers them thereto. The information stored in the register 607 is transferred to the register 605 and then stored therein again. The information in the register 605 is tranferred to a branch circuit 608. This transferred information is transferred through the circuit 608 to any one of the memory 1004, 1005 or 1006 according to the process name, and then stored in the selected memory. Such operation is repeated by times equal to the number stored in the counter 418, or the number of the reception transitions. However, when the flip-flop 605 is in OFF state, the operation of the block 5 is stopped. The explanation of the configuration of the L value calculation circuit 605 is omitted because it is similar to the L value calculation circuit 406.

The description will be now given of elements for generating the stable state in the configuration of FIG. 23. The state s after the reception transition which is propagated because of the transmission transition −t is transferred to a branch circuit 610, which transfers that state s to any one of the memory 1004, 1005 or 1006 according to the process name. Then, the stable state including the state s and the reception transition +t corresponding to the transmission transition −t are transferred to an OR circuit 611. That information and the state (*5) after the transition of the reception transition propagated because of the transmission transition −t are transferred to an stable state generation circuit 612. This circuit 612 generates a new stable state based on that input information and then transfers it to a memory 613.

FIG. 24 shows a detailed configuration of the block 7 for detecting the unspecified executable transition. The information which is detected by the block 5 and stored in the register 531 as well as the information which is detected by the block 6 and stored in the register 603 are transferred to a memory 1007 and stored therein as the unspecified executable transition in the format of FIG. 5(b).

FIG. 25 shows a detailed configuration of the block 8 for detecting the deadlock state. In this figure, a stable state stored in the memory 1015 is transferred to a register 801 and stored therein. A stable state stored in the register 801 is then transferred to the memory 101. When a transmission transition from each state which is the element of a stable state on the protocol specification is not specified, a flip-flop 803 becomes ON. When the output of the flip-flop 803 is in ON state, a selection gate is made open, and the stable state in the register 801 is transferred to a register 804. The stable state transferred to the register 804 is the deadlock state, and is thus transferred to a memory 1008 and then stored therein in the format of FIG. 5(c).

FIG. 26 shows a detailed configuration of the block 9 for detecting the specified unexecutable transition. In this figure, when the content of the counter 305 in the block 3 is 0, which means that there exists no state to be processed in the next step, the expansion of the state transition is stopped and the block 9 is then triggered. The information about the state provided from the memory 101 is transferred to a selection gte 901, by which the information with regard to the state transition such as a state, a signal and a state after a transition is selected among the information in the memory 101, and then transferred to a register 903. The information transferred to the register 903 is transferred to a selection circuit 902, which transfers that information to any one of the memory 1004, 1005 or 1006. When there exists an information identical with that information in one memory, a flip-flop 904 is made to be in ON state. When the output of the flip-flop 904 is in ON, a selection gate 905 is made open, and the information in the register 903 is transferred to a register 906. The information in the register 906 is transferred to a memory 1009 and then stored therein in the format of FIG. 5(d).

FIG. 27 shows a detailed configuration of the block 11 for detecting the bounded overflow. In this figure, assume that the predetermined channel capacity is stored in a register 1103. When the expansion of a transmission transition is triggered by the block 4, the L value at the original state of the transmission transition stored in the register 403 and the L value at the destination state of the transmission transition stored in the register 407 are transferred to an unprocessed signal calculation circuit 1101. The circuit 1101 calculates $c_{ij}$ and delivers it to a comparator 1104. This comparator compares $c_{ij}$ with the channel capacity. When $c_{ij}$ exceeds the channel capacity, $c_{ij}$ is transferred from the comparator 1104 to a memory 1010 and then stored therein in the format of FIG. 5(e). When the expansion of a reception transition is triggered in the block 5, the L value at the original state of the reception transition stored in a register 520 and the L value at the destination state of the reception transition stored in a register 522 are transferred to an unprocessed signal calculation circuit 1102. At the same time, each of those L values is transferred to the corresponding one of the memory 1004, 1005 or 1006 according to the process name. A state transition sequence between each element of the L value at the original state of the reception transition and each element of the L value at the destination state of the reception transition is transferred from the memories 1004, 1005 and 1006 to the calculation circuit 1102. The circuit 1102 calculates $c_{ij}$ and delives it to a comparator 1105. The comparator 1105 compares $c_{ij}$ with the channel capacity stored in the register 103. When $c_{ij}$ exceeds the channel capacity, it is transferred to the memory 1010 and then stored therein in the format of FIG. 5(e).

Figure 28:
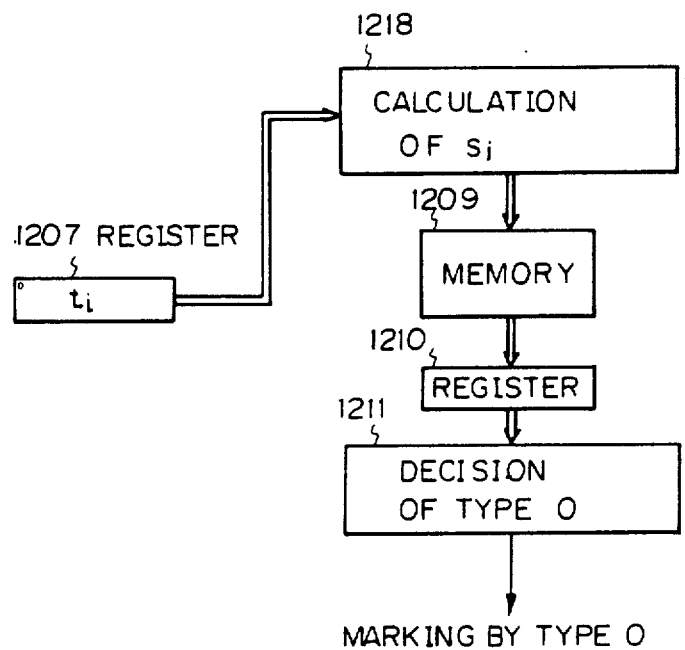

FIG. 28 shows a detailed configuration of the block 12 for stopping expansion and detecting the unbounded overflow. This configuration is shown by four subblocks shown in FIG. 28(a) through FIG. 28(d).

FIG. 28(a) shows a detailed configuration of a subblock for stopping the expansion by type O. In this figure, the information with respect to the destination state of the transmission transition is stored in the register 407 mentioned before. The L value in the register 407 is transferred to any one of the memory 1004, 1005 or 1006. When there exists on the chart a past state having the same L value except for the number of times of occurrance as the L value at the destination state of the transmission transition, that L value at that state, or the past occurrance state is transferred from the memories 1004, 1005 and 1006 to a register 1204. At the same time, a flip-flop 1201 is made to be in ON state. A selection gate 1012, when the output of the flip-flop 1201 is in ON state, transfers the information in the register 407 to a register 1203. The L value transferred to the register 1203 and the L value transferred to the register 1204 are transferred to any one of the memory 1004, 1005 or 1006. A state transition sequence from the initial state to each state of the L value is transferred from the memories 1004, 1005 and 1006 to an unprocessed signal comparison circuit 1205. This circuit 1205 calcultes an unprocessed signal in each channel according to that state transition sequence, and compares both the L value without the number of times of occurrance with each other. When the both L value are identical with each other, the output of a flip-flop 1206 is made to be ON and then the destination state of the transmission transition is marked by type 0. As a result, expansion is stopped.

FIG. 28(b) shows a detailed configuration of a subblock for stopping expansion by type 1. In this figure, the state $t_i$ stored in a register 1207 is a state appearing under the conditions of type 1. The state $t_i$ in the register 1207 is transferred to a $s_j$ calculation circuit 1218 which calculates the state $s_j$ appearing under the conditions of the type 1. The $s_j$ calculation circuit 1208 has the similar configuration as that shown in FIG. 20(a). The $s_j$ calculation circuit 1208 delivers $s_j$ to a memory 1209. The state $s_j$ in the memory 1209 is transferred to a register 1210 in sequence and further to a type 0 detection circuit 1211. The type 0 detection circuit 1211 detects whether $s_j$ is marked by type 0 or not, and then when all the $s_j$ are marked by type 0, marks $t_i$ by type 1. Thus expansion is stopped.

FIG. 28(c) shows a detailed configuration of a subblock for stopping expansion by type 2. In this fiture, a new stable states which is output of the stable state generation circuits 526 or 616 is transferred to a memory 1015 and is being stored therein. When a new stable state transferred to the memory 1015 coicides with the old ones which have already been stored in the memory 1015 without the number of times of occurrance, that new stable state is transferred to a register 1212. The state $t_i$ in the type 2 detection condition is being stored in a register 1213. The stable state in the register 1212 and the state $t_i$ are transferred to one of the memories 1004, 1005 or 1006. In those memories, the possibility of reaching from each state of the stable state to the L value at the state $t_i$ is detected. When there exists that possibility, the output of a flip-flop 1214 is made to be ON. At this state of the flip-flop 1214, the state $t_i$ is marked by type 2 and expansion is thus stopped.

FIG. 28(d) shows a detailed configuration of a subblock for detecting the unbounded overflow. This configuration is similar to that of FIG. 28(a), except that the states $s_i$ and $t_i$ each having the same L value except for the number of times of occurrance thereof are transferred from the memories 1004, 1005 and 1006.

(Effect of the invention)

The present invention provides useful support for a protocol design. In details, a state transition expansion obtained by the present invention chart provides a state transition sequence for each process. Therefore, the present invention can provide a state transition sequence for each process which induces an error in a protocol specification to be tested. For example, the state transition sequence from the state 2.0 to the state 4.1 in the process 1 in FIG. 6(a) leads to the deadlock state. This sequence corresponds to the state transition sequence from the state 1.0 to the state 1.1 in the process 3 in FIG. 6(c). Therefore, a protocol designer may correct only those sequences in the process 1 and 3.

The following table 1 shows the comparison of the present invention and a prior art, where a protocol to be tested is the one shown in FIG. 1.

TABLE 1

|  | prior art (ratio) | present invention (ratio) |
|---|---|---|
| number of states | 25 (1) | 14 (0.64) |
| number of state transitions | 19 (1) | 13 (0.68) |

Accordingly, the amount of necessary process requested for the validity test is considerably reduced as compared with that of a prior art, and a hardware implementation becomes possible, together with the reduction of memory capacity which stores a state transition chart, et al.

From the foregoing, it will now be apparent that a new and improved protocol validity has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A protocol validation system which receives a protocol specification having a plurality of processes, in a form of an electrical signal, and tests said protocol specification by expanding a state transition in each process in accordance with transition information of said protocol specification to find errors of said protocol specification, and delivers indication of said errors in the form of an electrical signal, said protocol validation system comprising:

(a) first memory means (1) for storing a protocol which is subject to validation, including an initial state;

(b) first operating means (3, 4, 5, 6) connected to said first memory means for receiving information stored therein and expanding a transmission transition and a corresponding reception transition for each said process, and for monitoring a system state composed of a state in each process and a signal state on a channel between processes;

(c) second memory means (10) connected to said first operating means for storing a state transmission expansion chart for each said process and L value of expanded states for each process;

(d) second operating means (7, 8) connected to said first and second memory means and controlled by said first operating means for detecting an unspecified executable transition and a deadlock state, in accordance with a predetermined condition, during expansion of a transition;

(e) third operating means (11) connected to said first and second memory means and controlled by said first operating means for detecting a bounded overflow, which is a system state such that the number of signals on a channel between processes exceeds a given channel capacity;

(f) fourth operating means (9) connected to said first and second memory means and controlled by said first operating means for detecting a specified unexecutable transition after completion of expansion; and (g) fifth operating means (12) connected to said second memory means and controlled by said first operating means for providing an electrical signal to said first operating means to stop said expansion in accordance with detection of a predetermined condition.

2. A protocol validation system according to claim 1, wherein said fifth means stops expansion of a state transition when a current system state monitored by said first means is a stable state in which there exists no signal on a channel, and when said current stable state coincides with a past same stable state, and when said current stable state and said past same stable state are on a common state transition sequence.

3. A protocol validation system according to claim 1, wherein when a current system state monitored by said first means is a stable state in which there exists no signal between a channel, and when said current stable state coincides with a past same stable state, and when said current stable state and said past same stable state are on different state transition sequences, said first means expands only one of the state transitions which are expanded from said current stable state and said past stable state.

4. A protocol validation system which receives a protocol specification having a plurality of processes, in a form of an electrical signal, and tests said protocol specification by expanding a state transition in each process in accordance with transition information of said protocol specification to find errors of said protocol specification, and delivers indication of said errors in the form of an electrical signal, said protocol validation system comprising:

(a) first memory means (1) for storing a protocol which is subject to validation, including an initial state;

(b) first operating means (3, 4, 5, 6) connected to said first memory means for receiving information stored therein and expanding a transmission transition and a corresponding reception transition for each said process, and for monitoring a system state composed of a state in each process and a signal state on a channel between processes;

(c) second memory means (10) connected to said first operating means for storing a state transition expansion chart for each said process and L value of expanded states for each process;

(d) second operating means (7, 8) connected to said first and second memory means and controlled by said first operating means for detecting an unspecified executable transition and a deadlock state, in accordance with a predetermined condition, during expansion of a transition;

(e) third operating means (11) connected to said first and second memory means and controlled by said first operating means for detecting a bounded overflow, which is a system state such that the number of signals on a channel between processes exceeds a given channel capacity;

(f) fourth operating means (9) connected to said first and second memory means and controlled by said first operating means for detecting a specified unexecutable transition after completion of expansion; and (g) fifth operating means (12) connected to said second memory means and controlled by said first operating means for providing an electrical signal to said first operating means to stop said expansion in accordance with detection of a predetermined condition, and for providing an electrical signal to said first operating means to stop said expansion upon detection of an unbounded overflow which is a system state such that the number of signals on a channel at a certain system state is intended to increase infinitely at another system state which follows said certain system state and which is identical to said certain system state.

* * * * *